US012611022B2

(12) United States Patent
Natrasevschi

(10) Patent No.: US 12,611,022 B2
(45) Date of Patent: Apr. 28, 2026

(54) APPARATUS AND METHOD FOR WEARABLE AUTOMATED HAIR HEALTH-MONITOR AND STYLER

(71) Applicant: Alfred Natrasevschi, Fort Collins, CO (US)

(72) Inventor: Alfred Natrasevschi, Fort Collins, CO (US)

( * ) Notice: Subject to any disclaimer, the term of this patent is extended or adjusted under 35 U.S.C. 154(b) by 128 days.

(21) Appl. No.: 18/697,871

(22) PCT Filed: Nov. 6, 2022

(86) PCT No.: PCT/IB2022/060660
§ 371 (c)(1),
(2) Date: Apr. 2, 2024

(87) PCT Pub. No.: WO2023/084373
PCT Pub. Date: May 19, 2023

(65) Prior Publication Data

US 2024/0407525 A1 Dec. 12, 2024

Related U.S. Application Data

(60) Provisional application No. 63/278,575, filed on Nov. 12, 2021.

(51) Int. Cl.
*A45D 24/36* (2006.01)
*B26B 21/40* (2006.01)
(Continued)

(52) U.S. Cl.
CPC .......... *A45D 24/36* (2013.01); *B26B 21/4056* (2013.01); *A45D 2026/009* (2013.01); *A45D 2044/007* (2013.01); *A45D 2200/207* (2013.01)

(58) Field of Classification Search
None
See application file for complete search history.

(56) References Cited

U.S. PATENT DOCUMENTS 2,972,351 A * 2/1961 Morgan .................. B26B 19/00 30/202
3,233,614 A * 2/1966 Lefcoski ................. B26B 19/02 132/213
(Continued)

OTHER PUBLICATIONS

English translation of Xiong Chinese Patent Document CN107693321, published 2018.*
(Continued)

*Primary Examiner* — Bernard G Lindsay

(57) ABSTRACT

A wearable automated hair health-monitor and styler comprising a headband having a track adapted for contouring a wearer's head, an ear muff fastener pivotally affixed to each of two opposing ends of the headband, a positioner having a positioner drive mechanism slidably mounted to the headband, a stylus having a stylus drive mechanism and a stylus body with a distal end mounted to the positioner such that the distal end is oriented to face toward the wearer's head when the ear muff fasteners are worn generally over a temple area or ears of the wearer's head and a functional module adapted to be removably attached to the distal end. The device is configured to position the distal end of the stylus at a desired position with respect to the wearer's head and then configure the functional module to perform a procedure as per a selected hair monitoring and styling option.

19 Claims, 17 Drawing Sheets

(51) Int. Cl.
*A45D 26/00* (2006.01)
*A45D 44/00* (2006.01)

(56) References Cited

U.S. PATENT DOCUMENTS

| | | | | |
|---|---|---|---|---|
| 7,153,283 | B1 * | 12/2006 | Triolo | A61H 15/0078 601/102 |
| 2012/0234146 | A1 * | 9/2012 | Lakin | B26B 19/00 83/76.2 |
| 2015/0040934 | A1 * | 2/2015 | Krenik | A45D 24/36 132/214 |
| 2017/0340897 | A1 * | 11/2017 | Unger | A61N 5/0617 |

OTHER PUBLICATIONS

English translation of Xiong Chinese Patent Document CN107669458, published 2018.*

* cited by examiner

APPARATUS AND METHOD FOR WEARABLE AUTOMATED HAIR HEALTH-MONITOR AND STYLER

CROSS-REFERENCE TO RELATED APPLICATION

This application is a National Stage Application of PCT/IB2022/060660 filed Nov. 6, 2022 which claims priority to U.S. Provisional Application No. 63/278,575, filed Nov. 12, 2021, both of which are incorporated herein by reference.

FIELD OF THE INVENTION

The present invention relates to systems and methods for hairdressing and hair health monitoring. More particularly, the present invention relates to a system that enables wearable automatic hair health-monitoring and hair styling.

BACKGROUND OF THE INVENTION

A large number of devices are available for cutting, trimming or styling of scalp hair and facial hair or beard. Several automated systems have also been introduced in the recent past for these purposes. Medical devices dealing with monitoring or examination of health of hair are becoming increasingly popular these days. However, in spite of the presence of all such devices, the processes of hair grooming or hair health monitoring still require substantial human intervention. For example, to get a haircut by using any of the present day available devices, a person has to hold and move the device manually. Thus human error causes unwanted results such as the frequent and proverbial “bad haircut”. The bulky and fixed apparatuses used for hair health monitoring also require an additional person to operate the devices. In addition, regular use of many of the existing hair grooming devices is detrimental to the health of hair.

Thus, there exists a requirement for a system and method which overcome the aforesaid drawbacks associated with automated hair-cutting and hair health monitoring systems.

OBJECTS OF THE INVENTION

An object of the present invention is to provide a system and method for automated hair-cutting and hair health monitoring.

Another object of the present invention is to provide a hair-cutting and hair health monitoring system that can work in multiple pre-programmed fully-automatic modes.

Yet another object of the present invention is to provide a light-weight, portable and wearable hair-cutting and hair health monitoring system.

Still another object of the present invention is to provide a safe device for hair-cutting.

Another object of the present invention is to provide a device which can do or maintain hairstyling even when the user or the user’s head changes position as in doing activities such as walking, exercising or during any other physical activities.

Another object of the present invention is to provide an adaptable wearable hair-cutting and hair health monitoring device that can work for anybody.

Still another object of the present invention is to provide a device that can automatically and precisely apply a solution or substance to hair located at any specific region of the scalp.

Another object of the present invention is to provide a wearable hair-cutting and hair health monitoring device that can diagnose hair conditions such as anagen, catagen, or telogen hair growth phases.

Yet another object of the present invention is to provide a system and method for a remotely operable hair-cutting and hair health monitoring system.

Another object of the present invention is to provide a device for hair-cutting and hair health monitoring which causes no damage to the hair.

These as well as other objects of the present invention are apparent upon inspection of this specification, including the drawings attached hereto.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present invention is directed to a system and method for automatically producing a desired hair-cut and/or for monitoring and treating health of hair in human being. The device of the present invention, referred to as wearable hair monitor and styler hereinafter, comprises a headband having a track adapted for contouring the head of the user and two ear muff fasteners disposed at the opposite ends of the headband. The ear muff fasteners are adapted to conform to the ears of the user and can hold the headband in place over the head. The ear muff fasteners use the ear canals as repetitive position reference and subsequent mechanical fastening to the scalp area adjacent to the ears. A drive mechanism housed inside the ear muff fasteners makes the headband rotate about an axis passing through the ear muff fasteners or through the opposite ends at a controlled angle and speed. A carriage, referred to as a clipper or positioner or locator, is slidably mounted on the track, driven by a stepper motor. A stylus is slidably and rotatably mounted on the positioner with a distal end of the stylus being oriented toward the scalp/head of the user. The distal end of the stylus is configured to removably receive a functional module. Different functional modules can carry out various hair health monitoring and styling procedures and those are attached to the distal end of the stylus as per requirement. To get a required procedure done at a specific location of the scalp as per a selection of a hair health monitoring and styling option, the wearable automated hair health-monitor and styler is locally or remotely operable to position the distal end of the stylus at that desired specific position with respect to the wearer’s head. The positioning of the distal end is done by configuring the ear muff fasteners to cause a rotation of the headband by a desired angle and/or configuring the positioner drive mechanism to cause the positioner to traverse along the headband by a desired distance and/or by configuring the stylus drive mechanism to cause a desired displacement of the stylus relative to the positioner along a desired path. A claw type of functional module disposed at the distal end of the stylus can be actuated to loosely hold a strand of hair and snip it when required. The combined movements effected by the headband, positioner and the stylus enable multiple degree-of-freedom manipulation of a strand of hair for giving a cut at a desired length and scalp location or for giving a specific hair style or for performing a hair-monitoring or a hair treatment procedure. The wearable hair monitor and styler is configured to communicate with one or more computing devices to take instructions from and give feedback to for producing a desired hair-cut and/or for monitoring health of scalp and facial hair of a user. Once the wearable hair monitor and styler is worn by a user, it carries out the given tasks automatically without requiring any manual intervention of the user.

BRIEF DESCRIPTION OF DRAWINGS

The accompanying drawings, which are incorporated herein and form a part of the specification, illustrate the present invention and, together with the description, further serve to explain the principles of the invention and to enable a person skilled in the relevant art to make and use the invention. The present invention will become more fully understood from the detailed description given herein below and the accompanying drawings which are given by way of illustration only, and thus are not limitative of the present invention, and wherein.

DETAILED DESCRIPTION OF THE INVENTION

Figure 1C:
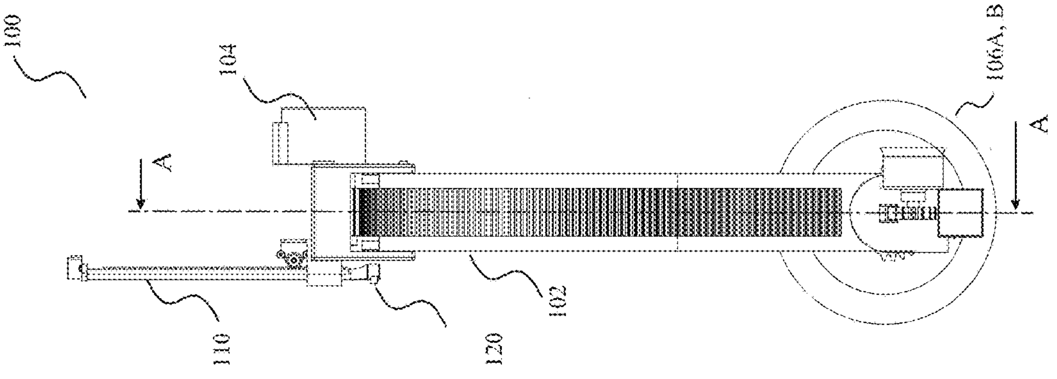
FIG. 1C illustrates a right side view of the wearable hair monitor and styler in accordance with an embodiment of the present invention.
Figure 1B:
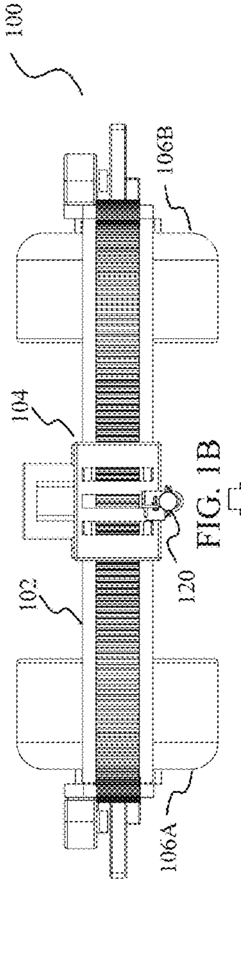
FIG. 1B illustrates a top side view of the wearable hair monitor and styler in accordance with an embodiment of the present invention.
Figure 1A:
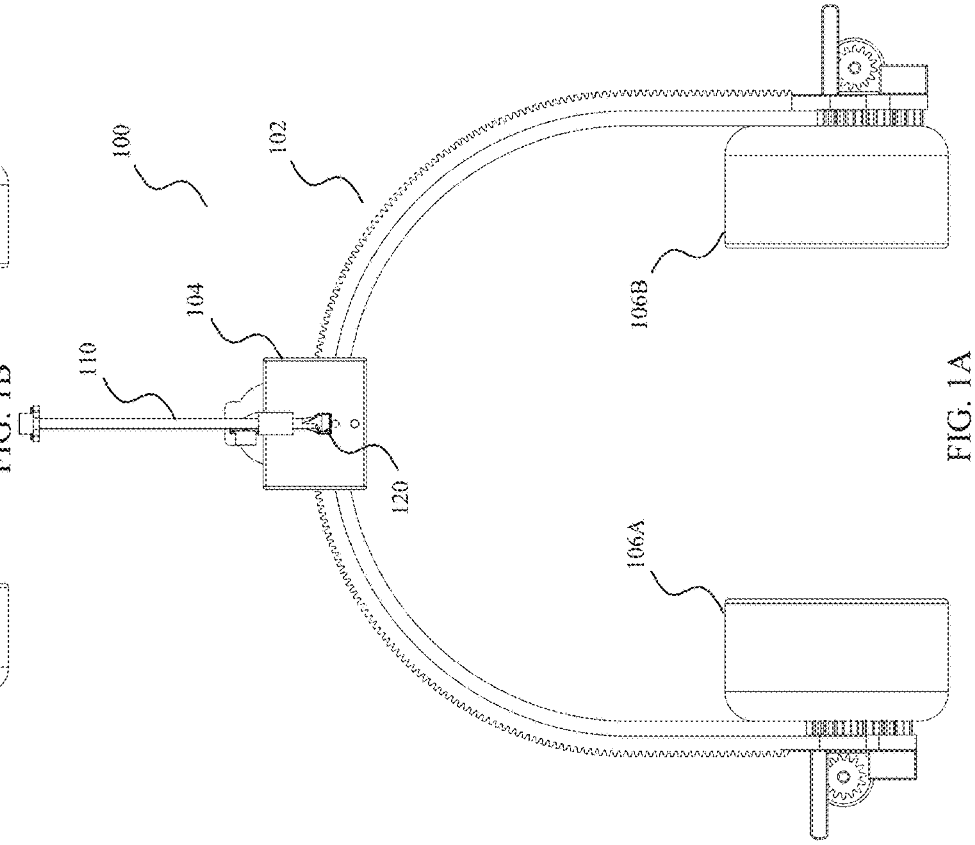
FIG. 1A illustrates a front side view of a wearable hair monitor and styler in accordance with an embodiment of the present invention.
Figure 2A:
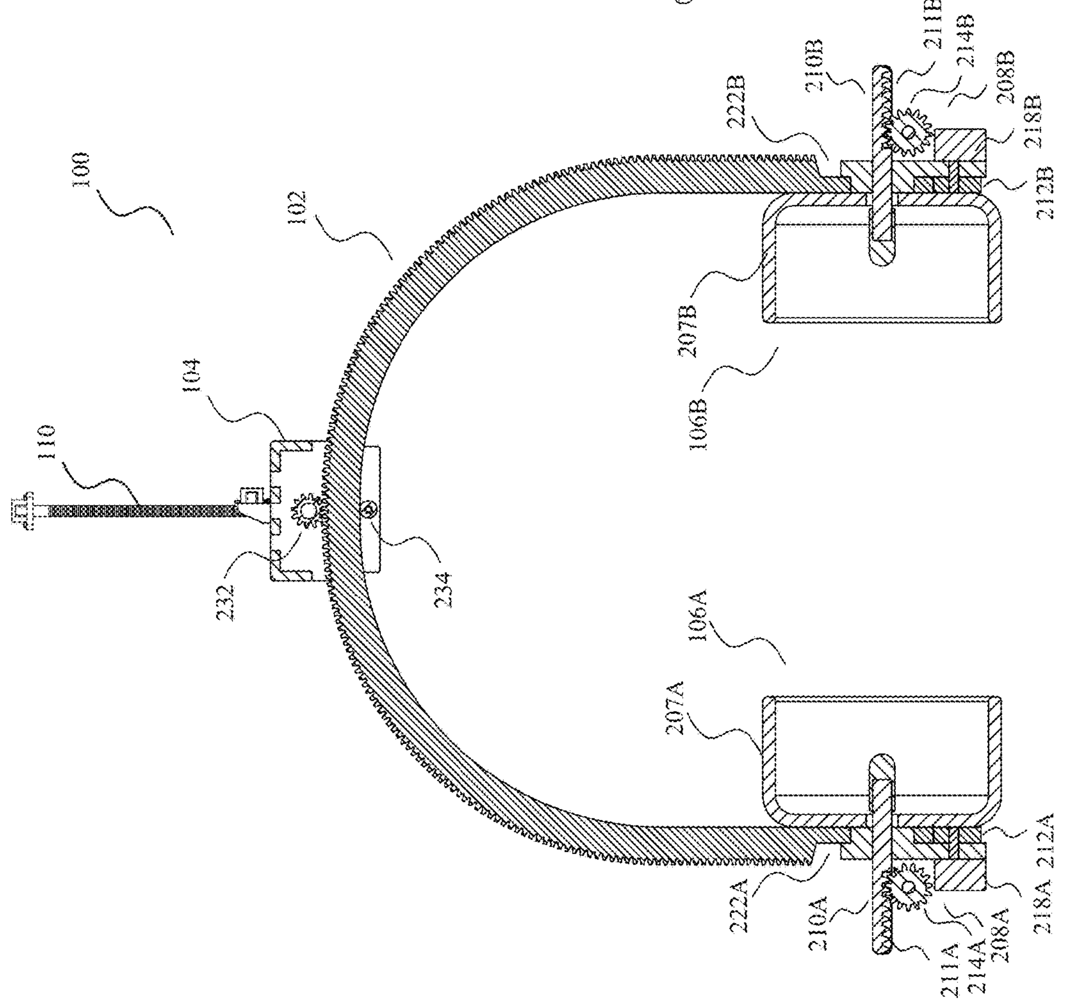
FIG. 2A illustrates a cross-sectional view taken along line A-A shown in FIG. 1C.
Figure 2B:
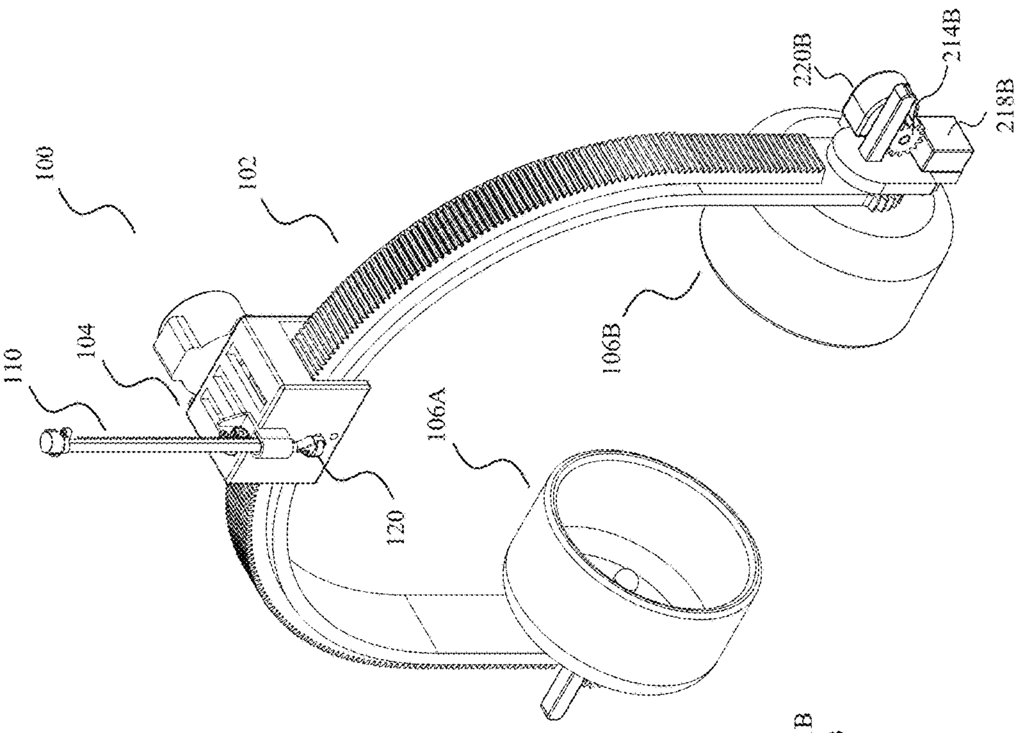
FIG. 2B illustrates a front perspective view of the wearable hair monitor and styler in accordance with an embodiment of the present invention.
Figure 3D:
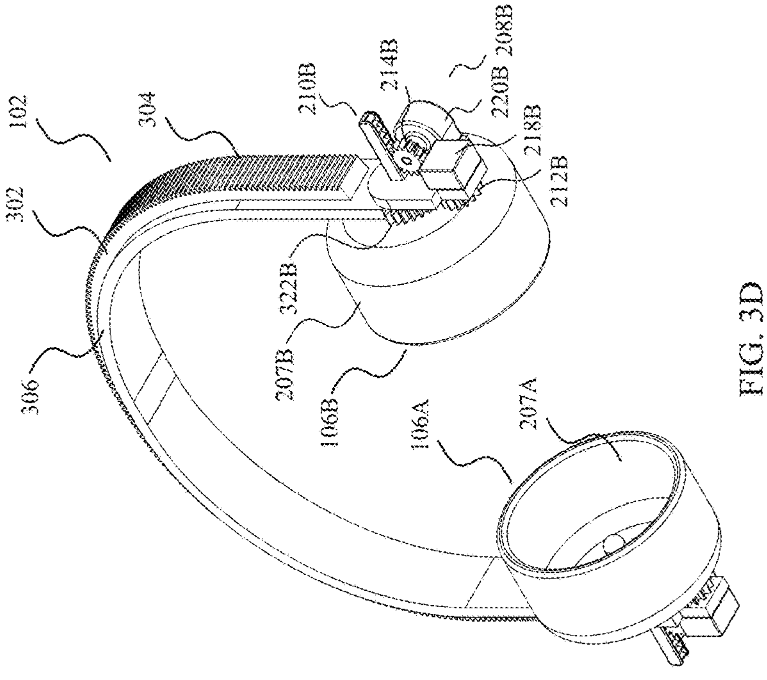
FIG. 3D illustrates a front perspective view of the headband and ear muff fasteners of the wearable hair monitor and styler in accordance with an embodiment of the present invention.
Figure 3C:
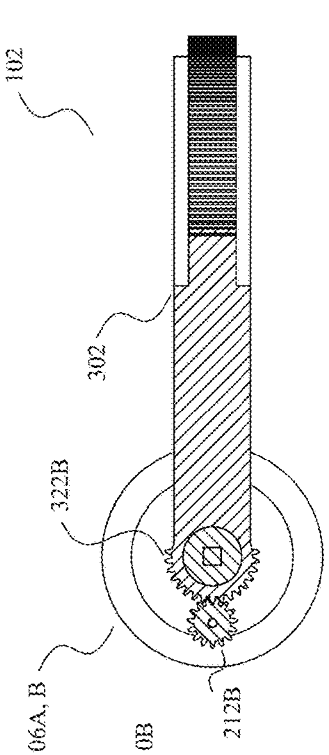
FIG. 3C illustrates a cross-sectional view taken along line B-B shown in FIG. 3B.
Figure 3A:
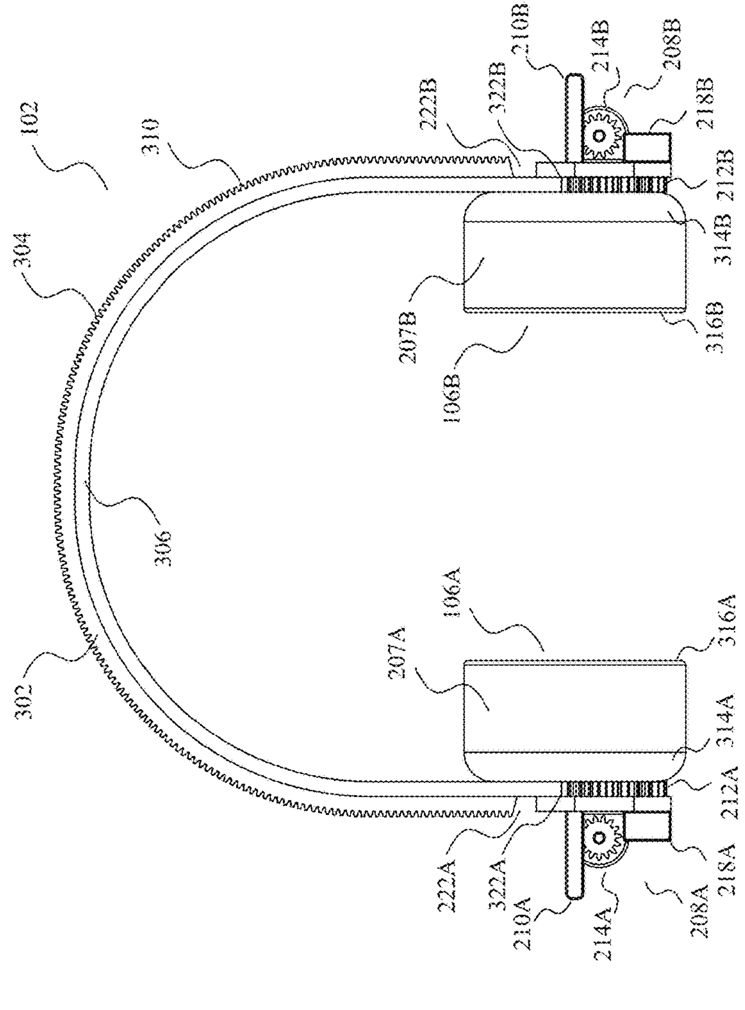
FIG. 3A illustrates a front side view of a headband and ear muff fasteners of the wearable hair monitor and styler in accordance with an embodiment of the present invention.
Figure 3B:
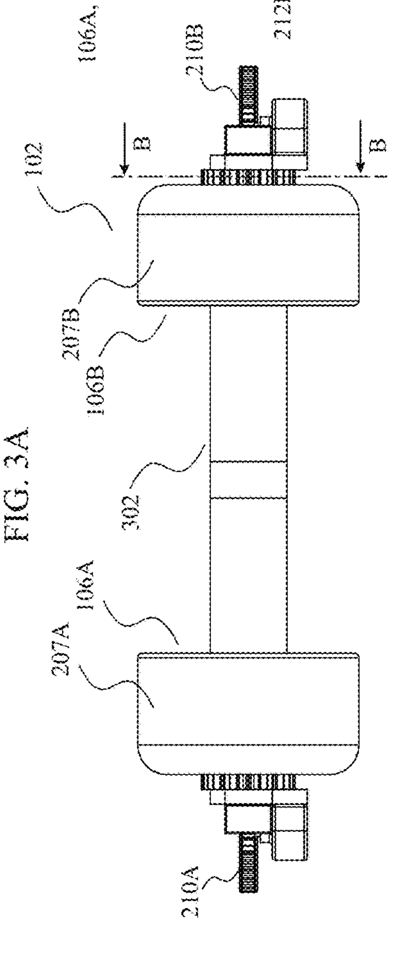
FIG. 3B illustrates a bottom side view of a headband and ear muff fasteners of the wearable hair monitor and styler in accordance with an embodiment of the present invention.
Figure 4E:
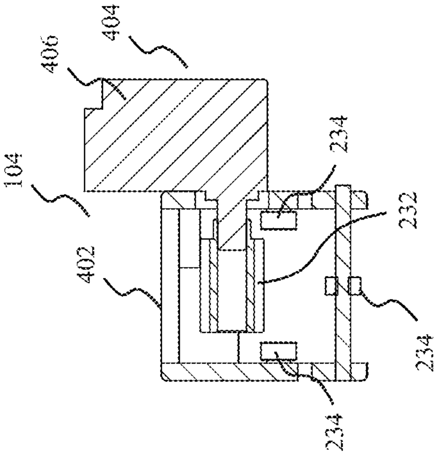
FIG. 4E illustrates a cross-sectional view taken along line C-C shown in FIG. 4D.
Figure 4C:
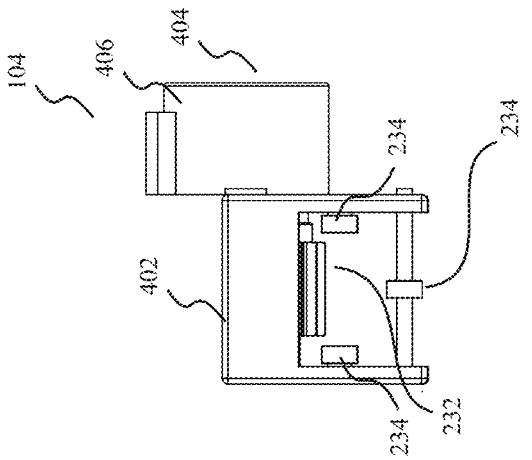
FIG. 4C illustrates a right side view of the positioner of the wearable hair monitor and styler in accordance with an embodiment of the present invention.
Figure 4D:
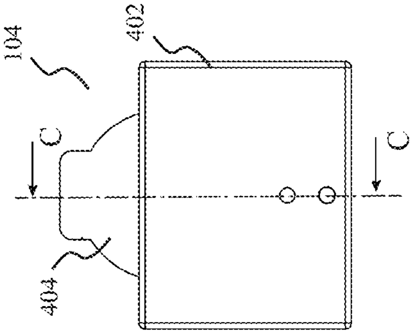
FIG. 4D illustrates a front side view of the positioner of the wearable hair monitor and styler in accordance with an embodiment of the present invention.
Figure 4B:
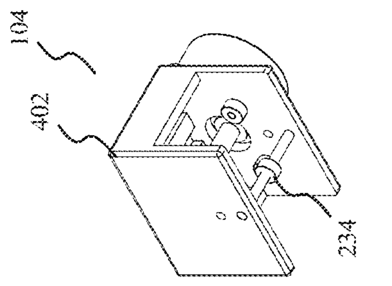
FIG. 4B illustrates a bottom perspective view of a positioner of the wearable hair monitor and styler in accordance with an embodiment of the present invention.
Figure 4A:
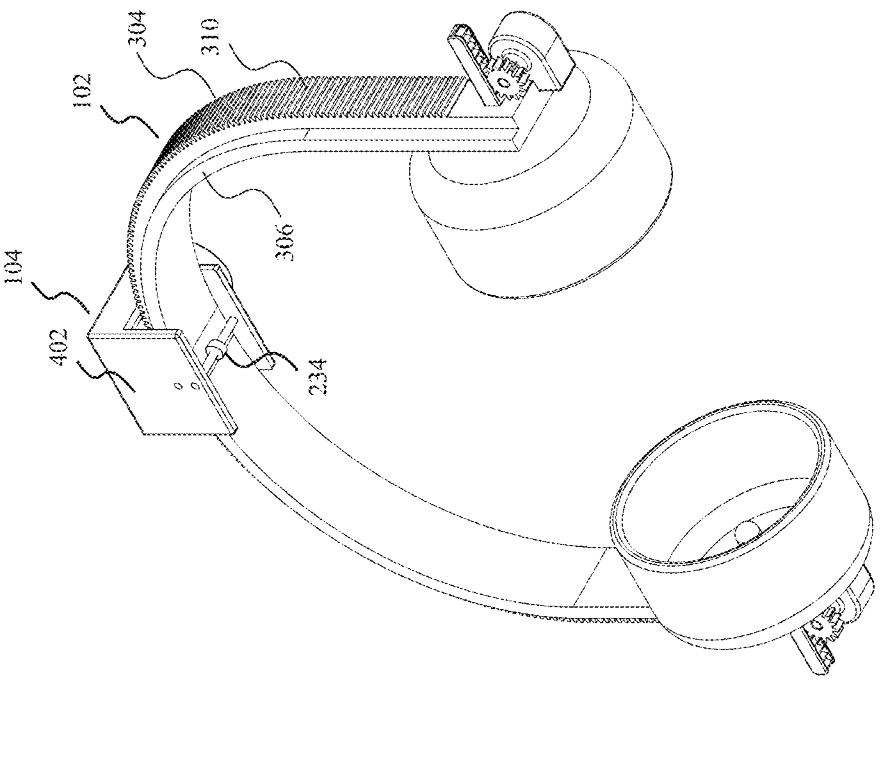
FIG. 4A illustrates a bottom perspective view of a positioner mounted on the headband of the wearable hair monitor and styler in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

Reference to FIGS. 1A to 1C and 2A-2B the wearable hair monitor and styler 100 of the present invention comprises a headband 102, a clipper or positioner 104 (the terms "clipper" and "positioner" are used herein alternatively and interchangeably), a stylus 110, a functional module 120 and two ear muff fasteners 106A and 106B. In addition, reference to FIG. 11, the system 1100 for the wearable hair monitor and styler 100 comprises one or more user devices 1110 and, optionally, a remote server 1112. For the purpose of simplification of the drawings, the wearable hair monitor and styler 100 is illustrated in FIGS. 7C, 8A, 12A-12E, 13A-13C, 14A-14C and 15A-15D without the ear muff fasteners 106A and 106B even though those are essential parts of the invention.

Reference to FIGS. 3A-3D, the headband 102 comprises an arcuate track 302, a gear rack 304 disposed over the track 302, a headband guide 306 that runs parallel to the gear rack 304, and two opposing extreme ends 222A and 222B. The arcuate track 302 is adapted for contouring a wearer's head and extends in an arcuate path that parallels approximately the average human scalp between the extreme ends 222A and 222B. The gear rack 304 comprises a plurality of teeth 310 evenly and linearly disposed along the arcuate track 302 between the extreme ends 222A and 222B.

Figure 16A:
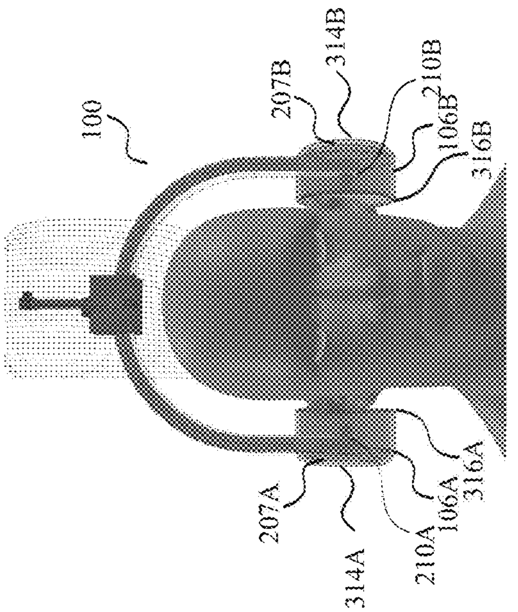
FIGS. 16A-16D illustrate exemplary steps of positioning a wearable hair monitor and styler on a user in accordance with an embodiment of the present invention.
Figure 16B:
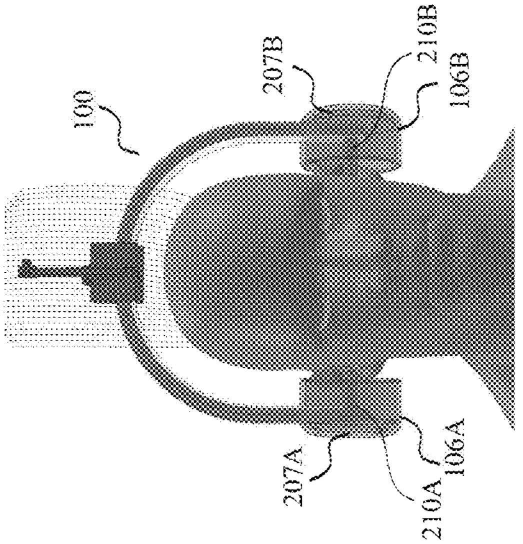
Figure 16C:
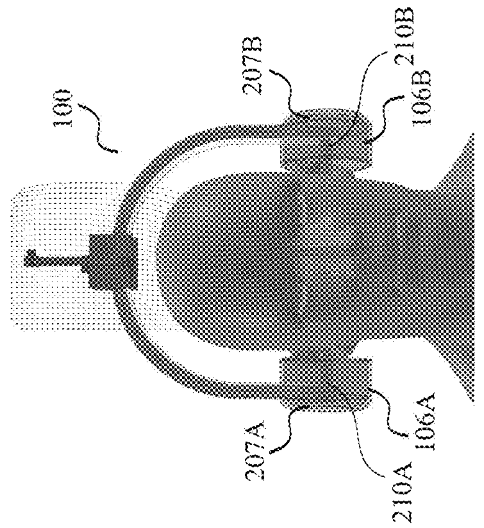
Figure 16D:
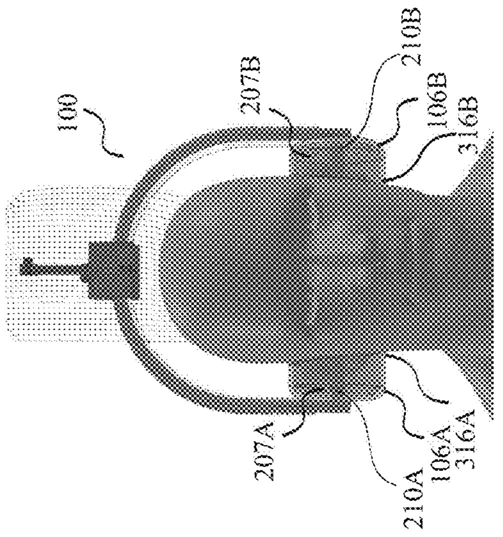

Reference to FIGS. 1A-1C, 2A-2B, 3A-3C and 16A-16D each of the ear muff fasteners 106A and 106B comprises an ear cup 207A and 207B and an ear muff drive mechanism 208A and 208B respectively. Each of the ear cups 207A and 207B comprises an ear cup proximal end 314A and 314B respectively which are configured to be detachably attached to the extreme ends 222A and 222B of the headband 102 respectively, and an ear cup distal end 316A and 316B respectively configured to conform to the general shape and size of human ears. Each of the ear cups 207A and 207B has a substantially cylindrical extensible locator 210A and 210B respectively. One or both ear muff fasteners 106A and 106B further comprise an ear muff drive mechanism 208A/208B, a headband control module 1102 (shown in FIG. 11), an ear muff fastener control module 1109 (shown in FIG. 11), one or more sensors and a power source. The ear muff drive mechanism 208A/208B includes one or more electric motors and gears. For example, gears 212A and 212B coupled to motors 218A and 218B mesh with the set of teeth 322A and 322B disposed on the extreme ends 222A and 222B respectively to rotate the headband 102 with respect to the ear muff fasteners 106A and 106B to any desired angle and hold it at that desired position. Again, gears/pinions 214A and 214B coupled to motors 220A and 220B respectively mesh with gear racks 211A and 211B disposed on extensible locator 210A and 210B respectively to actuate movements of the extensible locators 210A, 210B and ear cups 207A and 207B. The extensible locators 210A and 210B can be actuated to extend toward the ear canals and be retracted back as per requirement. Similarly, the ear cups 207A and 207B can also be actuated to extend toward the sides of the head and be retracted back as per requirement. In an extended condition, the extensible locators 210A and 210B help in aligning the ear cups along the axis of the ear canal of the user. While FIG. 16A illustrates the extensible locators 210A and 210B, and ear cups 207A and 207B in retracted positions, FIGS. 16B and 16C illustrate the extensible locators 210A and 210B gradually extending toward the ear canals from the ear cup proximal ends 314A and 314B or from the extreme ends 222A and 222B respectively. Once the extensible locators 210A and 210B reach at least a portion of the ear canals of the user, the ear cups 207A and 207B can be actuated to move toward the ear/temple area of the user so that the ear cups 207A and 207B can have a strong grip around ears/temple area of the user as shown in FIG. 16D. In some embodiments, the extension and retraction movements of the extensible locators 210A and 210B, and ear cups 207A and 207B can be done manually by the user.

Reference to FIGS. 1A-1C, 2A-2B, 3A-3D and 7A-7B, when donned, the headband 102 extends over the user's head 704 and, being resiliently conformable with the contour of the wearer's head 704, gets secured under tension to the user's head 704, with the extreme ends 222A and 222B being held on opposite sides of the user's head by the ear muff fasteners 106A and 106B respectively thereby preventing the headband 102 from falling off the wearer's head. The ear cups 207A and 207B allow angular movement with respect to the extreme ends 222A and 222B so that ear muff fasteners 106A and 106B conform to the contours of the user's ear region and firmly hold the headband 102 over the user's head. The extreme ends 222A and 222B allow the ear muff fasteners 106A and 106B to be affixed at any desired distance along the arcuate headband 102 to let a user adjust the distance of the headband 102 from the user's scalp as per requirement.

Figure 11:
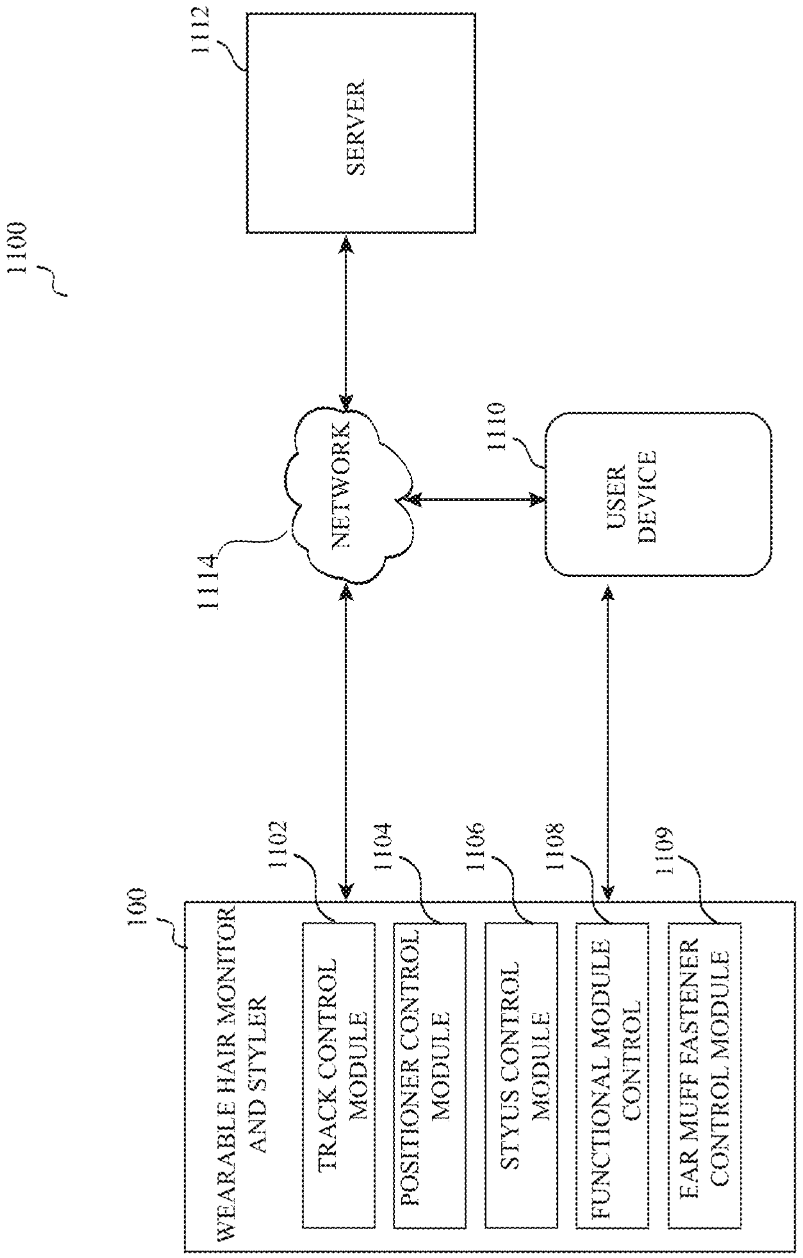
FIG. 11 illustrates a general architecture of the wearable hair monitor and styler system that operates in accordance with an embodiment of the present invention.

Reference to FIGS. 2A and 4A-4E, the positioner 104 comprises a positioner body 402, a positioner drive mechanism 404, one or more sensors and a positioner control module 1104 (shown in FIG. 11). The positioner drive mechanism 404 may comprise an electric motor 406, one or more gears 232 coupled to the shaft of the electric motor 406 and one or more guide rollers 234. The positioner body 402 is slidably received by the headband guide 306 and is configured to be movably mounted over the headband 102 so that the positioner 104 can traverse along the headband 102 in continuous motion or in discrete steps. The one or more gears 232 of the positioner drive mechanism 404 are arranged in meshing arrangement (for example, similar but not limited to a rack and pinion arrangement) with the teeth 310 of the gear rack 304.

Figures 5A, 5B, 5C, 5D, 5E, 5F, 5G, 5H, 5I:
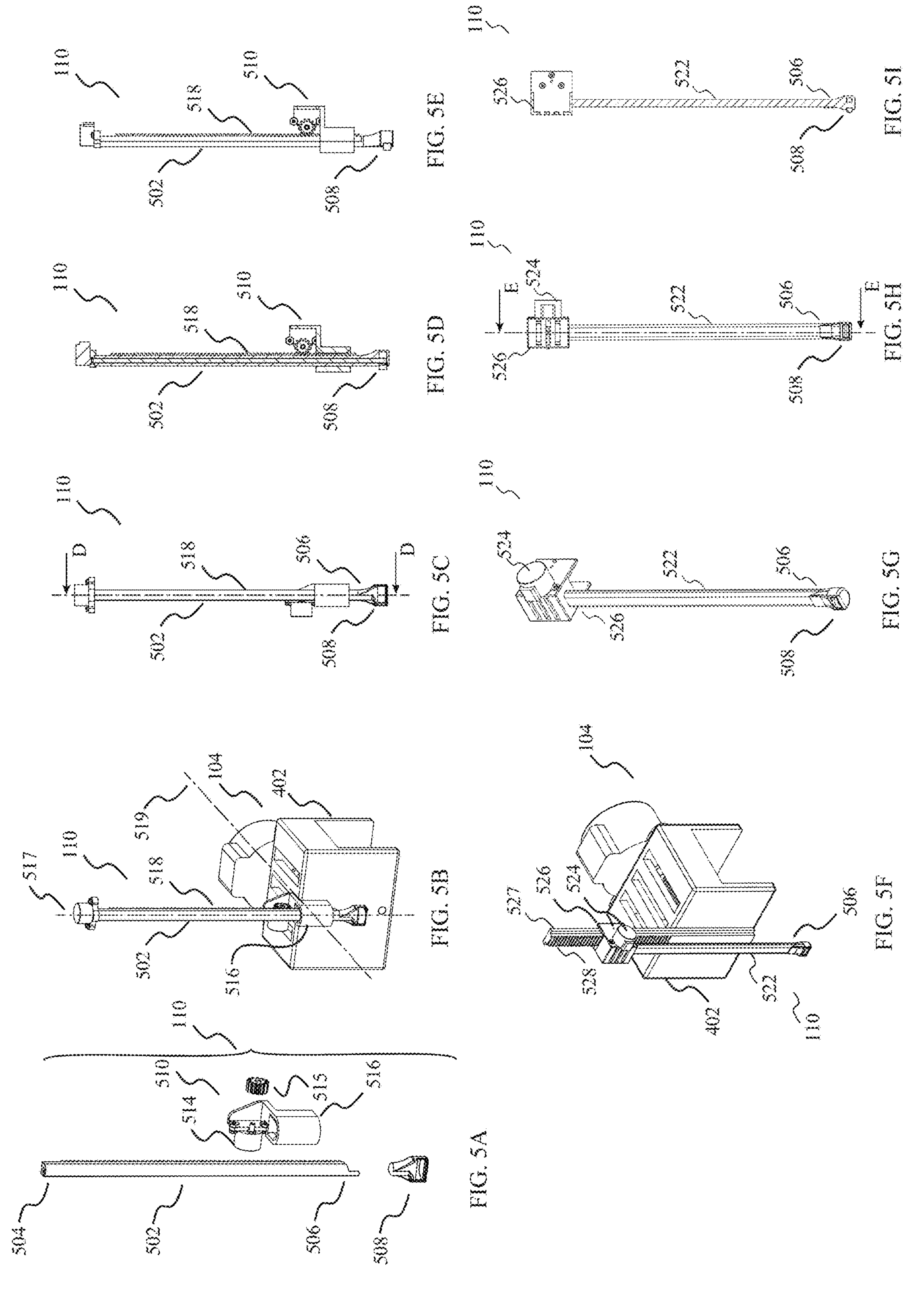
FIG. 5A illustrates an exploded view of the stylus with a functional module of the wearable hair monitor and styler in accordance with an embodiment of the present invention.
FIG. 5B illustrates a front perspective view of the stylus with a functional module mounted on a positioner of the wearable hair monitor and styler in accordance with an embodiment of the present invention.
FIG. 5C illustrates a front view of the stylus with a functional module in accordance with an embodiment of the present invention.
FIG. 5D illustrates a cross-sectional view taken along line D-D shown in FIG. 5C.
FIG. 5E illustrates a right side view of the stylus with a functional module in accordance with an embodiment of the present invention.
FIG. 5F illustrates a top perspective view of a second embodiment of the stylus with a functional module mounted on the positioner.
FIG. 5G illustrates a bottom perspective view of the second embodiment of the stylus with a functional module in accordance with an embodiment of the present invention.
FIG. 5H illustrates a front view of the second embodiment of the stylus with a functional module in accordance with an embodiment of the present invention.
FIG. 5I illustrates a cross-sectional view taken along line E-E shown in FIG. 5H.

The stylus 110, reference to FIGS. 5A-5I, comprises a stylus body 502 and a stylus drive mechanism 510. In some embodiments, the stylus body 502 is dimensioned to be an elongated body having a proximal end 504 and a distal end 506 spaced apart from each other. The stylus drive mechanism 510 comprises an actuator or an electric motor 514, one or more gears 515, a stylus holder 516 and a stylus control module 1106 (shown in FIG. 11). Reference to FIGS. 5A-5E, in a first embodiment, the stylus body 502 is provided with a rack 518 having a plurality of teeth formed therein and the stylus drive motor 514 and the gears 515 are mounted on the positioner body 402 with the help of the stylus holder 516. The stylus drive mechanism 510 is configured to displace the stylus body 502 along longitudinal axis 517 as shown in FIG. 5B. In another embodiment, the stylus drive mechanism 510 is also configured to rotate the stylus body 502 about the axis 517 and 519, as required. In a second embodiment, reference to FIGS. 5F-5I, the motor 524 and the gears are mounted on the stylus body 522 itself and the stylus holder 526 slidably couples the stylus body 522 to the positioner body 402. The guiding-channel 527 having a plurality of teeth formed therein is disposed on the positioner body 402 and it slidably receives at least a part of the stylus 110. In both the embodiments of stylus 110 the distal end 506 is oriented substantially radially inward facing toward the scalp of a user and the proximal end 504 oriented substantially radially outward facing away from the scalp when the device 100 is worn by a user over his/her head. The distal end 506 is configured to receive a functional module 508.

Figures 6A, 6B, 6C, 6D, 6E, 6F, 6G, 6H, 6I:
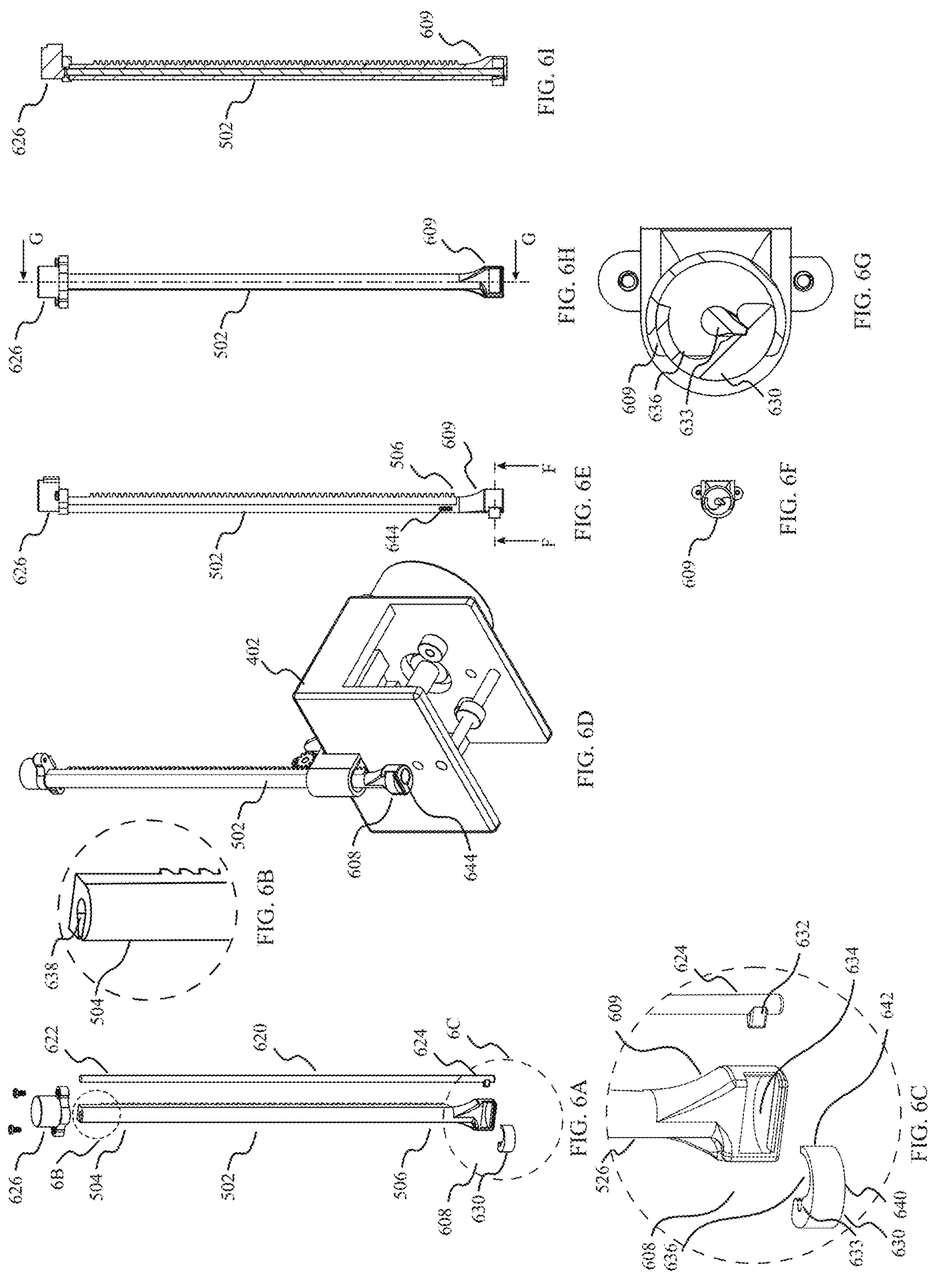
FIG. 6A illustrates an exploded view of the stylus with a functional module in accordance with an embodiment of the present invention.
FIG. 6B is an enlarged view of the portion of the stylus as illustrated in FIG. 6A and identified as detail 6B in FIG. 6A.
FIG. 6C is an enlarged view of the portion of the stylus and the functional module as illustrated in FIG. 6A and identified as detail 6C in FIG. 6A.
FIG. 6D illustrates a bottom perspective view of the functional module attached to the stylus and mounted on the positioner in accordance with an embodiment of the present invention.
FIG. 6E is left side view of the stylus with functional module in accordance with an embodiment of the present invention.
FIG. 6F is a cross-sectional view taken along line F-F shown in FIG. 6E.
FIG. 6G is an enlarged view of the cross-sectional view taken along line F-F shown in FIG. 6E.
FIG. 6H is front side view of the stylus with functional module in accordance with an embodiment of the present invention.
FIG. 6I is a cross-sectional view taken along line G-G shown in FIG. 6H.
Figure 7A:
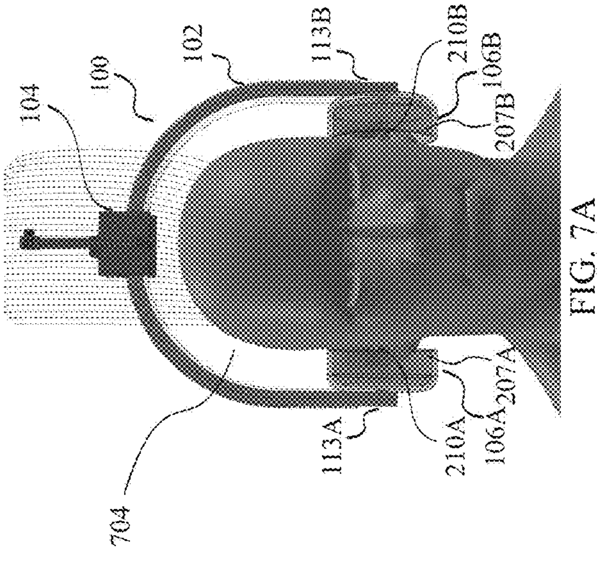
FIG. 7A illustrates a wearable hair monitor and styler being precisely positioned in the ear-canals of a person in accordance with an embodiment of the present invention.
Figure 7B:
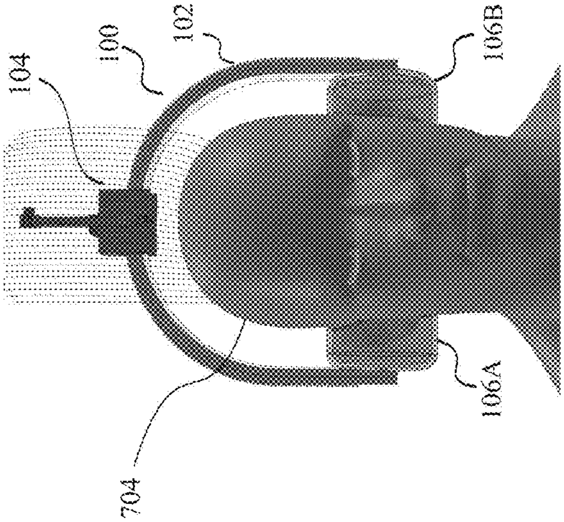
FIG. 7B shows the wearable hair monitor and styler of FIG. 7A fastened in position via pressure to temples over the ears of a person in accordance with one embodiment of the present invention.
Figure 7C:
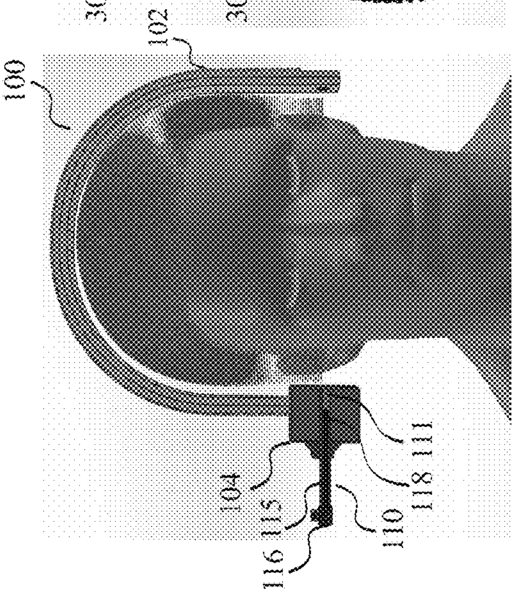
FIG. 7C shows the wearable hair monitor and styler at the beginning of a hair-cutting or monitoring sweep as per an embodiment of the present invention.
Figure 7D:
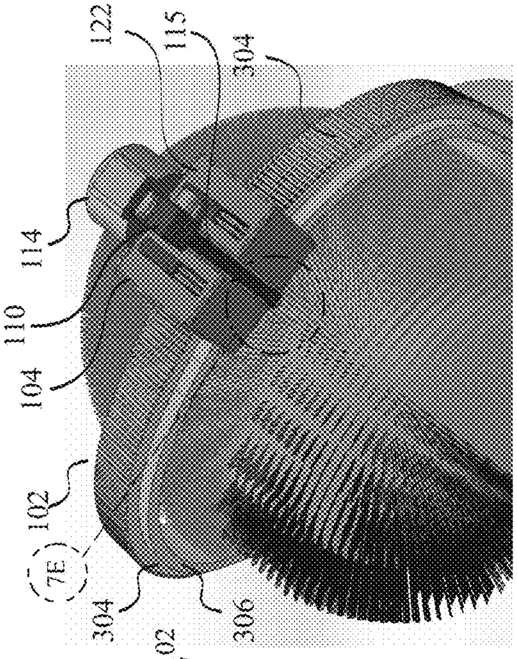
FIG. 7D illustrates the wearable hair monitor and styler in action mid-job in accordance with an embodiment of the present invention.
Figure 7E:
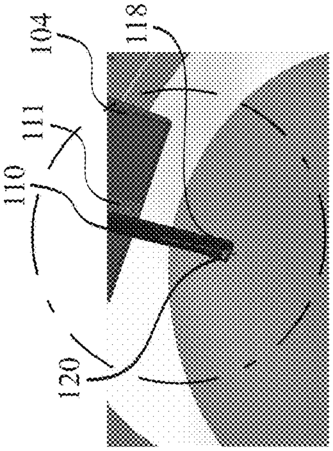
FIG. 7E is an enlarged view of the claw type functional module of the stylus holding a hair as illustrated in FIG. 7D and identified as detail 7E in FIG. 7D.

The functional module 508 is configured to perform one or more procedures as per a selected hair health monitoring and styling option. The one or more procedures include collection of hair clippings, capturing a still image or a video, heat-scaling of hair-ends, creation of split-ends, removing split-ends, applying a finish to hair-ends, emitting a light, generating a vibration and dispensing a liquid or a cream etc. Each functional module 508 can be configured to perform a single or multiples of such procedures. FIGS. 6A-6I depict a claw type functional module 608 which includes a functional module head 609, an engagement member 630, a functional module actuation mechanism having a drive shaft 620 and an actuator or an electric motor 626 and a functional module control 1108 (shown in FIG. 11). The drive shaft 620, in the present example, is configured to be operably supported by the stylus body 502 in the lumen 638 such that a first end 622 of the drive shaft 620 can be coupled to the actuator 626 and a wedge 632 disposed at a second end 624 of the drive shaft 620 remains in the functional module head 609. The engagement member 630, in some embodiments, has a curved profile that defines a radially inwardly recess 636 with a cutting edge 640 and a wedge pocket 633 as shown in FIG. 6C. The engagement member 630 is rotatably mounted to the stylus body 502 at the distal end 506 of the stylus body 502 when the wedge 632 is received by the wedge pocket 633. The axis of rotation of the engagement member 630 in the present example is parallel to the longitudinal axis of the elongated body 502. In retracted or withdrawn condition, the engagement member 630 remains flushed in the groove 634 provided on the functional module head 609. In a preferred embodiment, the engagement member 630 can be actuated in multiple modes with rotation of the drive shaft 620 driven by the actuator 626. For example, in a "grip mode" the engagement member 630 extends from the groove 634 but the end 642 of the engagement member does not necessarily abut the functional module head 609 so that the recess 636 formed between the engagement member 630 and the functional module 608 can gently/loosely and slidably hold a strand of hair. The engagement member 630 can also be actuated to either directly go to a "snip mode" from the retracted condition or can transition from "grip mode" to "snip mode". In the "snip mode", the cutting edge 640 of the engagement member 630 is made to come in contact with a stationary cutting face disposed on the functional module head 609 which results in cutting or snipping of the strand of hair held in the recess.

Figure 8A:
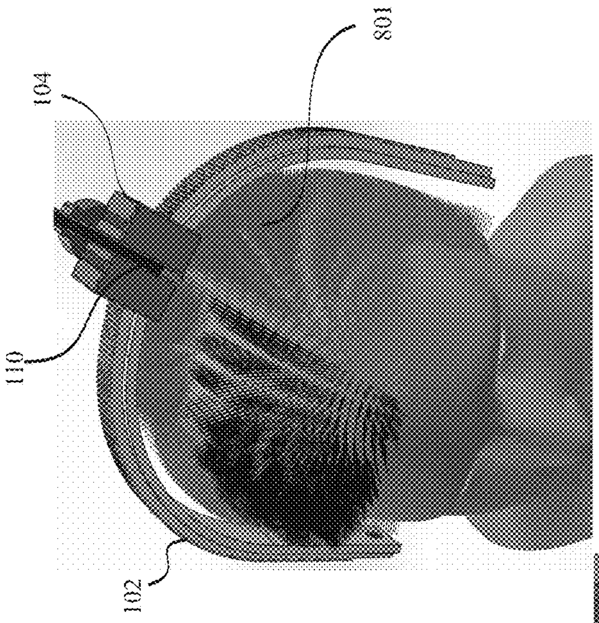
FIG. 8A illustrates the wearable hair monitor and styler positioning itself to carry out a discrete task in accordance with an embodiment of the present invention.
Figure 8B:
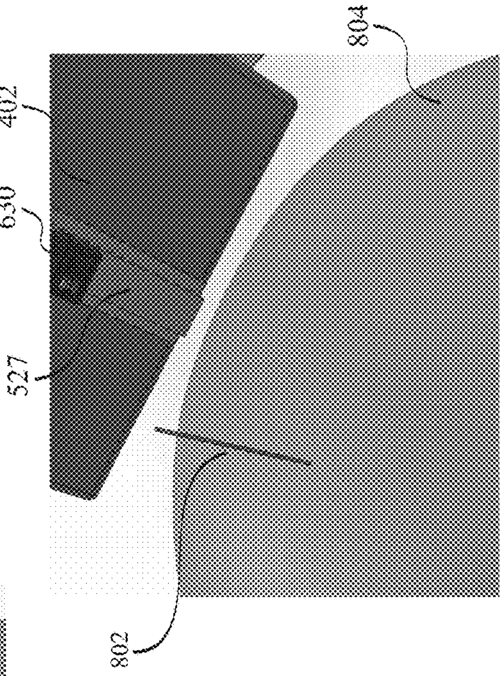
FIG. 8B illustrates the positioner of the wearable hair monitor and styler approaching a hair in accordance with an embodiment of the present invention.
Figure 8C:
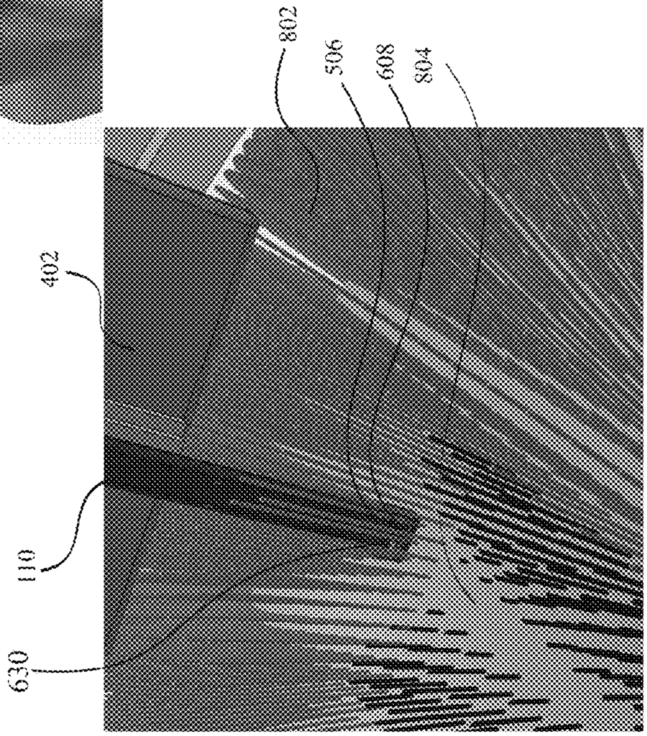
FIG. 8C illustrates the distal end of the stylus of the wearable hair monitor and styler touching the scalp of the person on which it is used in accordance with an embodiment of the present invention.
Figure 9A:
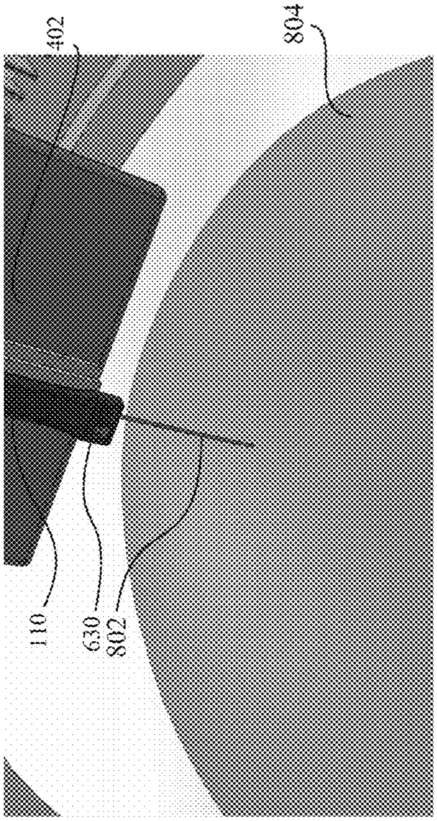
FIG. 9A illustrates the stylus with a functional module of the wearable hair monitor and styler moving toward the scalp location of hair of the person on which it is used in accordance with an embodiment of the present invention.
Figure 9B:
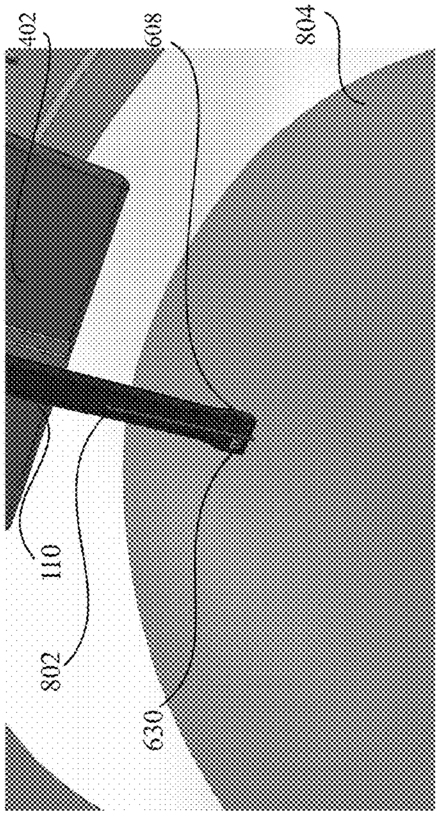
FIG. 9B illustrates the claw type functional module coupled to the stylus of the wearable hair monitor and styler initiating a grip over a hair as soon as the distal end of the stylus touches the scalp of the person on which it is used in accordance with an embodiment of the present invention.

Some of the functions of the device 100 are now described in the context of the present example which needs the claw type functional module 608 attached to the stylus 110. Reference to the FIGS. 8A-8C, 9A-9B and 10A-10C, once the distal end 506 reaches a desired position over the head 801 of a user as shown in FIG. 8A, the stylus 110 springs into action. From being in a retracted position as shown in FIG. 8B, the stylus 110 is driven slidingly up or down by the stylus drive mechanism along a path perpendicular to the track 302 in this example until the distal end 506 or the functional module 608 touches or comes very close to the scalp 804 of the user as shown in FIG. 8C. FIGS. 9A and 9B are the magnified views of these same steps. In some embodiments, the path of displacement of the stylus 110 may have multiple directions as the stylus 110 can be rotated about its longitudinal axis passing through the proximal end

Figure 9C:
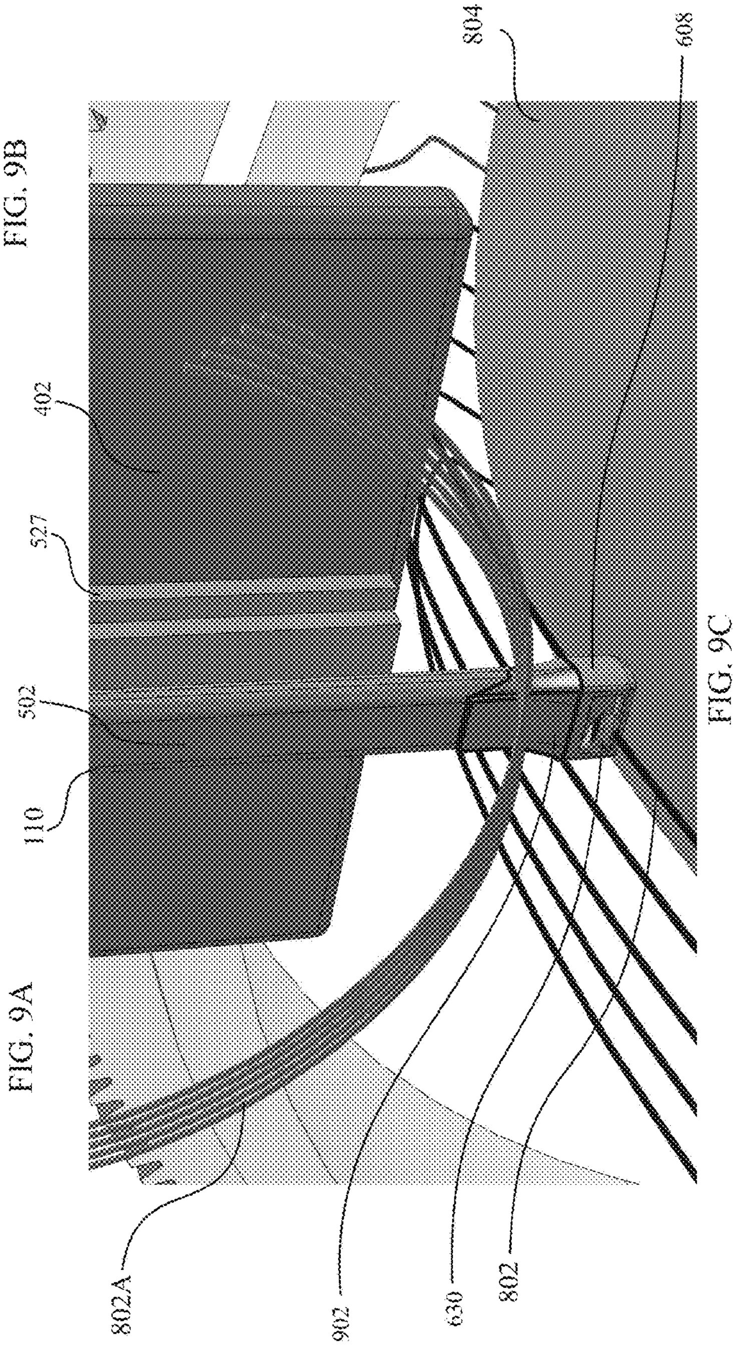
FIG. 9C illustrates a functional module configured to collect hair clippings by electrostatic attraction in accordance with an embodiment of the present invention.

504 and distal end 506 and also about an axis perpendicular to the longitudinal axis. Once the stylus 110 becomes aware that it has touched or is in close proximity to the scalp 804 based on the feedback received from the proximity sensor 644 disposed at the functional module 608 as shown in FIG. 6D or at the distal end 506 as shown in FIG. 6E, the engagement member 630 gets activated to grab the hair 802 as shown in FIG. 9B. In FIG. 9C, the detachable functional module 608 is shown performing the function of collecting the clipped hair pieces 802A. In this example, the functional module 608 is provided with an attachment 902 which is configured to get electrostatically charged so that it can attract and collect the hair clippings 802A.

Figure 10A:
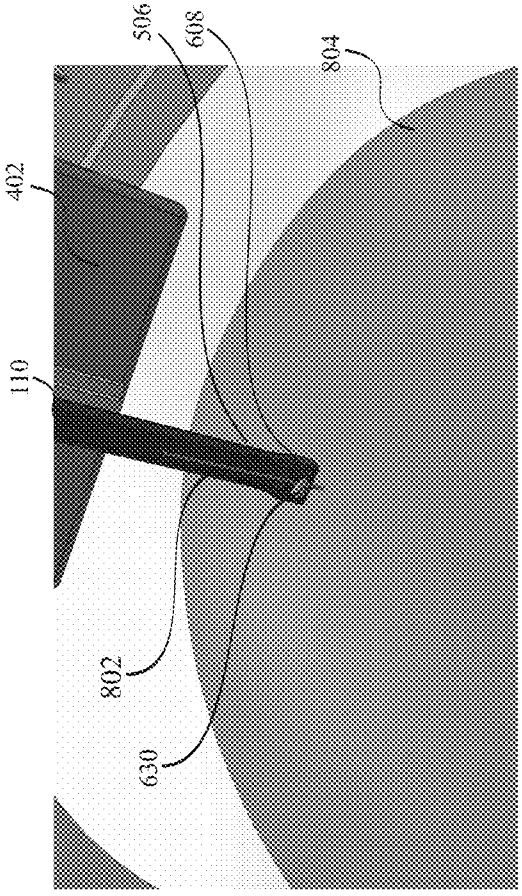
FIG. 10A illustrates the claw type functional module of the wearable hair monitor and styler gently gripping a hair in accordance with an embodiment of the present invention.
Figure 10B:
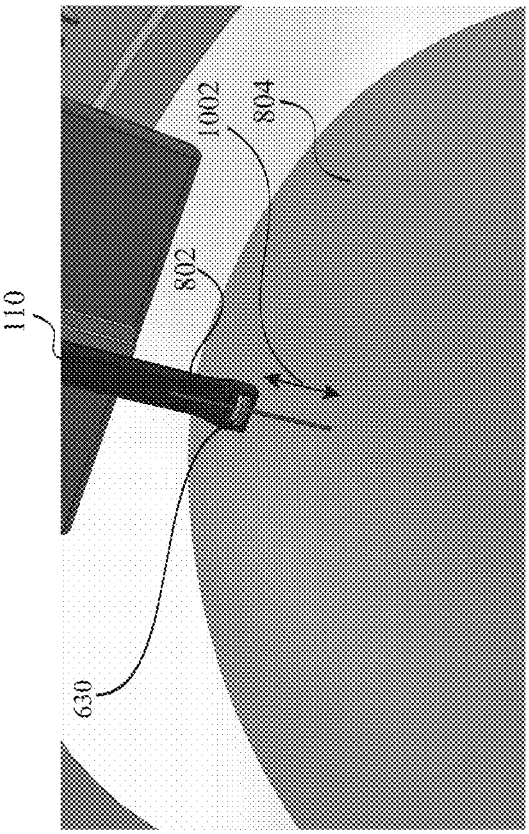
FIG. 10B illustrates the claw type functional module with the distal end of the stylus of the wearable hair monitor and styler at a desired position away from the scalp with a hair loosely gripped by the claw in accordance with an embodiment of the present invention.
Figure 10C:
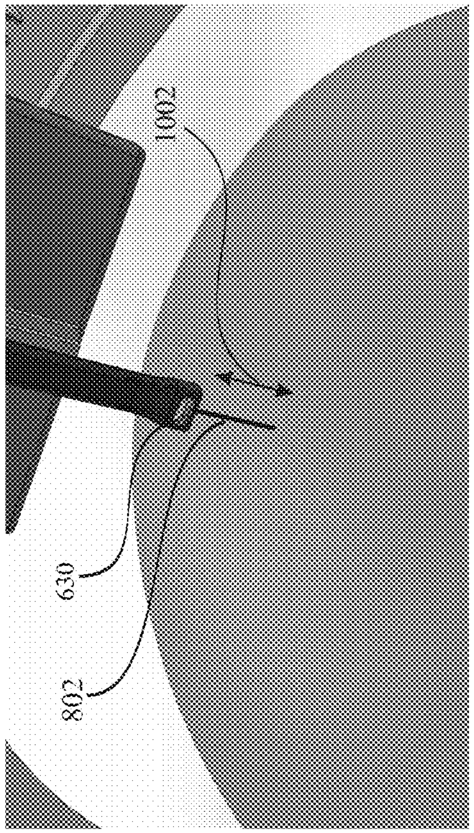
FIG. 10C illustrates the claw type functional module of the wearable hair monitor and styler snipping the gripped hair at a desired length from the scalp in accordance with an embodiment of the present invention.

In FIG. 10A, the engagement member 630 is shown engaging a hair 802 in "grip mode" when the distal end 506 or the functional module 608 touches the scalp 804. In the same "grip mode", the stylus 110 then retracts away from the scalp 804 until it reaches a predetermined distance 1002 while the engagement member 630 lets the hair 802 slide through it as shown in FIG. 10B without allowing the free end of the hair slip out of the grip. The engagement member 630 then transitions to "snip mode" from "grip mode" to snip the hair 802 held by the engagement member 630 at the length 1002 as shown in FIG. 10C.

FIG. 11 illustrates, in general, an environment depicting an exemplary configuration of the system 1100 for wearable hair monitor and styler 100. The system 1100 comprises a wearable hair monitor and styler 100, a user device 1110 and a wearable hair monitor and styler server 1112, all communicably connected with each other through an exemplary communication network 1114. The control modules 1102, 1104, 1106, 1108 and 1109 of the wearable hair monitor and styler 100 may comprise, individually or collectively, one or more physical processors, a memory and one or more communication modules. The communication modules are configured to enable communication between the wearable hair monitor and styler 100 and other user devices 1110 and a remote server 1112, as required. Such communication can be performed wirelessly or by wire to facilitate bidirectional transmission of data.

The user device 1110 of the present invention can be a mobile computing device such as a smartphone, smartwatch, tablet, laptop etc. or can be any other custom made similar computing device. An exemplary user device 1110 comprises a display, an input/output module, a communication module, a processor, a sensor module, a notification module and a device memory. The device memory includes one or more sets of instructions including an application. The application or "app" is a computer program that may be downloaded and installed on computing devices using methods known in the art. It can also be a set of instructions programmed on the hardware of the user device or a pre-loaded computer program or firmware or any such native application supplied with the user device.

The tasks or procedures which can be carried out by the wearable hair monitor and styler 100 comprise tracking and monitoring of hair health (via hair count, hair density and hair length growth measurement etc., for example), monitoring effects of external and internal factors (use of shampoo, hair treatment, nutrition, health condition, medication etc., for example), providing alert on change in hair health parameters from reference points, doing hair styling, collection of hair clippings, capturing a still image or a video, heat-scaling of hair-ends, creation of split-ends in hair, removing split-ends from hair, applying a finish to hair-ends, emitting a light, generating a vibration and dispensing of a liquid or a cream and hair grooming and hair-cutting and hair combing as per programmed instructions.

The headband 102 can be rotated around the ear muff fasteners 106A and 106B, the positioner 104 can slide along the headband 102, and the stylus 110 can move up and down in a direction substantially radial to the rotational axis of the headband 102 and can also rotate about multiple axes. The combination of these movements enables the stylus 110, specifically the distal end 506, to reach any region of the scalp of a user. Also, any combinations of these movements lets the stylus 110 grab a single/strand of hair or multiple hairs at any desired length from the root of the hair and hold the hair at any desired direction and angle as per a hair cut/style before the claw type functional module 120/608 snips the hair. Such versatility enables the wearable hair monitor and styler 100 to accomplish various tasks with the help of different functional modules. For example, under a "hair-health mode" the wearable hair monitor and styler 100 offers options such as "hair test" for assessing the health of the hair, "hair count" for counting hair, "hair elasticity" for evaluating elasticity of hair, "hair dryness" for measuring dryness of hair, "split ends" for repairing split ends of hair, "hair massage" for massaging hair/scalp, "hair lotion" for application of hair lotion etc. Similarly, under "hair-styling" mode, the wearable hair monitor and styler 100 offers "styling options" for selection of any pre-stored hair style (as stored at step 1703 of FIG. 17), "edit" option for letting a user to edit/modify/customize a particular stored hairstyle, "removal" option for removing hair, "coloring" option for getting hair colored etc. Against all of these actions, the wearable hair monitor and styler 100 allows examination of the results, record future corrections and tag events (errors, for example). The above-mentioned user interactions are given below in a tabulated form.

1. User Interaction
2. Select User Identity
3. Affix Device to Head
    - 3.1. Manual
    - 3.2. Automatic - use recorded Ear Canal
4. Select Mode Hair-Health
    - 4.1. Select Function
        - 4.11 Hair Test
            - 4.1.1.1. Hair Count
            - 4.1.1.2. Hair Elasticity
            - 4.1.1.3. Hair Dryness
            - 4.1.1.4. Split Ends
        - 4.1.2. Hair Massage
        - 4.1.3. Hair Lotion Application
        - 4.1.4. Split Ends Repair
    - 4.2. Start Function -continued

| | | |
|---|---|---|
| 4.3. End Function | | |
| | 4.3.1. Examine Result | |
| | 4.3.2 Record Future Correction | |
| | 4.3.3. Tag Events (e.g. errors) | |
| 5. Select Mode Hair-Styling | | |
| | 5.1.1. Select Function | |
| | | 5.1.1.1. Select Hair Style Stored |
| | | 5.1.1.2. Hair Style Edit |
| | | 5.1.1.3. Hair Removal |
| | | 5.1.1.4. Hair Coloring |
| | 5.1.2. Start Styling Function | |
| | 5.1.3. End Styling | |
| | | 5.1.3.1. Examine Results |
| | | 5.1.3.2. Record Future Correction |
| | | 5.1.3.3. Tag Events (e.g. errors) |

The movements/functions of the headband 102, positioner 104, stylus 110 and the functional module 508/608 are actuated by the respective control modules 1102, 1104, 1106 and 1108 respectively as per instructions received from the user device 1110 and/or from the server 1112. The instructions are computer-readable programmed instructions stored or user generated corresponding to a specific hair style or hair cut. The graphical user interface provided by the app of the present invention on a user device 1110 lets a user select, create or modify any hair health monitoring and styling option for one or more procedures which is then reproduced by the wearable hair monitor and styler 100 on a user's hair. The ear muff fastener control module 1109 facilitates ear-canal-positioning of the ear-muff fasteners 106A and 106B and that of the extensible locators 210A and 210B if automatic (not manual) mode of positioning the ear muff fasteners to the ear/temple area of the user is selected by the user.

For use, a user can select his/her user identity or log into his/her account using the user interface provided on the user device 1110. Then, as shown in FIG. 16A, the user has to first place the wearable hair monitor and styler 100 over the user's head with the ear muff fasteners 106A and 106B positioned around his/her ears or temple region. The system needs to know and control the position/location of the distal end 506 with respect to the scalp of the user in three-dimensional space (Cartesian coordinate system, for example) for its functioning. Accordingly, the position controllable variables that can be used by the wearable hair monitor and styler 100 are "t" (which refers to the angular or linear position of the headband 102 versus the ear muff fasteners 106A and 106B), "c" (which refers to the linear position of the positioner 104 along the headband 102) and "s" (which refers to the linear and/or angular position of the stylus 110 relative to the positioner 104). As in step 1702 of FIG. 17, for every user, the wearable hair monitor and styler 100 is required to be calibrated with respect to the user's scalp and hair when used for the first time so that the scalp of the user is mapped in terms of a plurality of variables such as the "t", "c" and "s", for example. These calibration parameters/variables can be stored in the wearable hair monitor and styler 100 or, as shown at step 1704, can be sent to the user device 1110 and/or to the server 1112. Against each user identifier, these variables can be stored in database tables as in step 1706. For hair-styling, a variable "s1" can be added to define the length of the hair at each (t, c, s) point on the scalp. Here, length of hair may refer to a length of hair measured from the root of the hair or from the scalp region around the hair. Thus, while the scalp is described by a Table comprising variables (t,c,s), the haircut is described by a Table comprising variables (t,c,s,s1). Further styling details may be added to the s1 variable: for example but not limited to a leaning angle Alpha to define non-vertical position of the hair. Such table comprises variables (t,c,s,s1,Alpha). Another styling detail may be degree of waviness described by a parameter Beta. Yet another styling detail may be an s1 variable that is a function describing a shape, for example a function describing hyperbola, parabola or any other function that serves a styling objective.

Figure 12A:
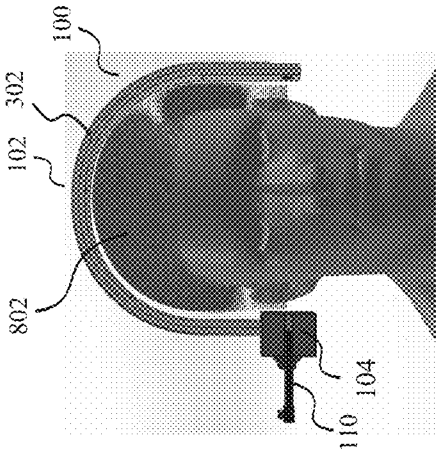
FIGS. 12A to 12E illustrate different stages of a haircutting procedure for tapered style carried out by the wearable hair monitor and styler in accordance with an embodiment of the present invention.
Figure 12B:
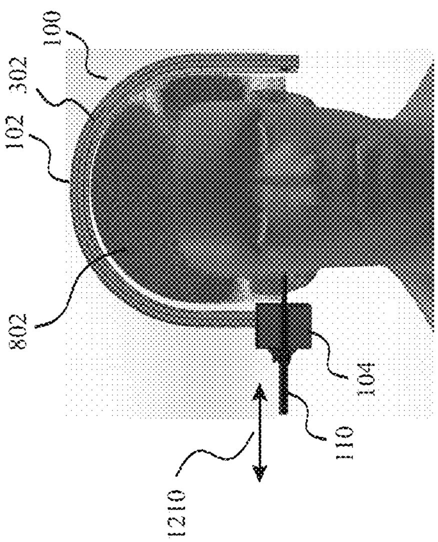
Figure 12C:
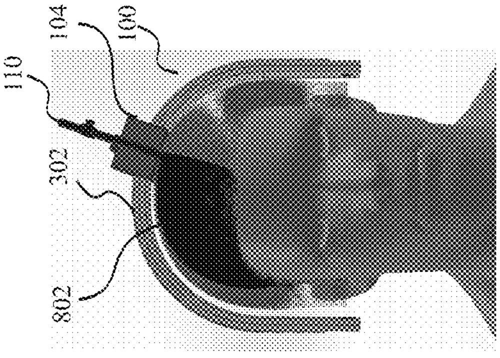
Figure 12D:
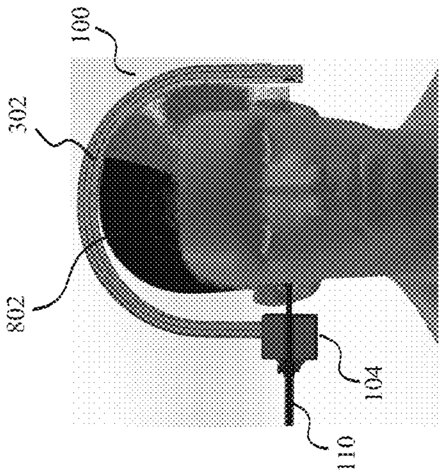
Figure 12E:
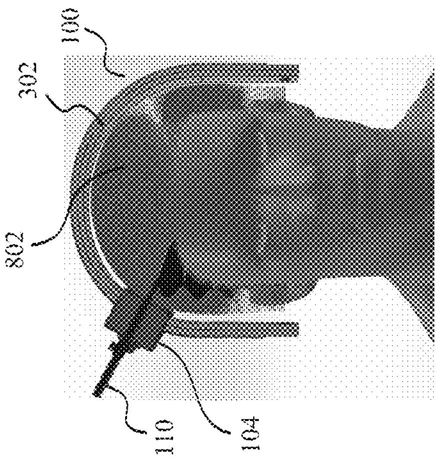
Figure 13C:
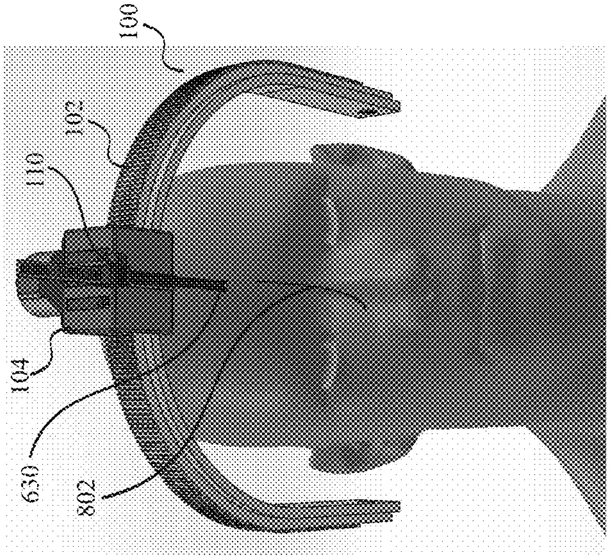
FIGS. 13A to 13C illustrate the wearable hair monitor and styler traversing in a desired direction while loosely gripping a hair to cut it at a required length in accordance with an embodiment of the present invention.
Figure 13B:
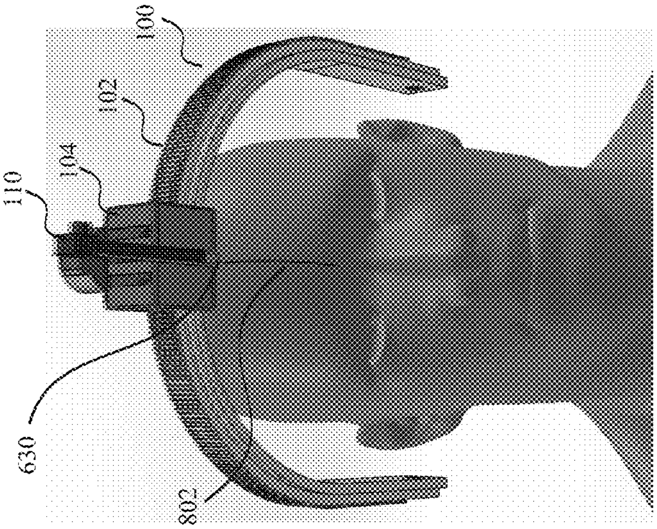
Figure 17:
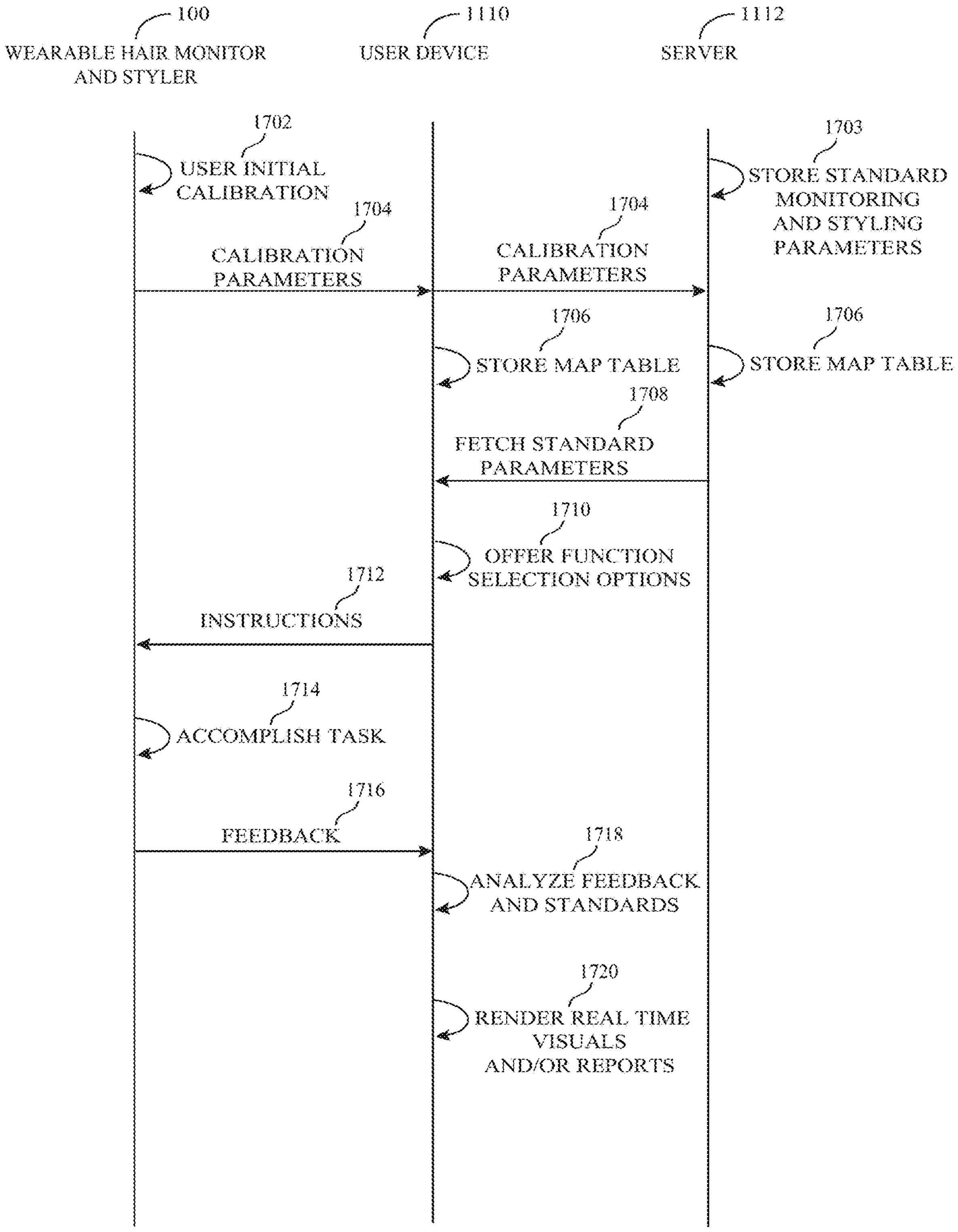
FIG. 17 illustrates a flowchart depicting the general steps associated with the method for the wearable hair monitor and styler functions in accordance with an embodiment of the present invention.

The user device 1110, in communication with the server 1112 as in step 1708 of FIG. 17, may fetch the data required for different health monitoring and styling options i.e. for different hair styles or for different hair health monitoring references from the database tables. The user interface provided on the user device 1110 offers option, as in step 1710, to select a hair-styling function or a hair-health monitoring function to be performed by the wearable hair monitor and styler 100. The wearable hair monitor and styler 100 is accordingly instructed, as in step 1712, to perform the selected function/procedure. The instructions may comprise the scalp-map (t, c, s variables for the user) and style-map (t, c, s, s1 variables for the selected style or hair-health reference). For any of the procedures/tasks, the distal end 506 of the stylus 502 is first positioned at a desired position with respect to the wearer's head/scalp. In the present example, depending on the hair style/cut selected by the user, the distal end 506 of the stylus 110 is positioned around the right ear of the wearer/user as shown in FIGS. 12A and 12B. The hair cut in this example begins from one extreme side of the scalp of the user as shown in FIG. 12B and then the positioner 104 progressively traverses a desired distance along the track 302 of the headband 102 for the first phase of the hair cut. Once the positioner 104 reaches a desired position on the track 302, the stylus drive mechanism 510 causes a desired displacement of the stylus 110 relative to the positioner 104 along a desired path. The displacement of the stylus 110 can be a result of one or more movements of the stylus 110 caused by the stylus drive mechanism 510. In the present example, the displacement of the stylus 110 happens along the path 1210. At each position of the distal end 506, the functional module 508 performs one or more procedures. In the present example, since the selected hair health monitoring and styling option is a hair-cut, the claw type functional module 608 is used. The functional module actuation mechanism comprising the drive shaft 620 and the actuator/motor 626 of the functional module 608 actuates the engagement member 630 to be in grip mode and/or to snip mode, as required. After performing the procedure at each position of the distal end 506, the positioner 104 passes through all intermediate positions to reach the middle of the scalp as shown in FIG. 12C. The positioner 104 then traverses back to the right side of the scalp as shown in FIG. 12D. The ear muff fasteners 106A and 106B then cause a rotation of the headband 102 by some desired degrees so that the positioner 104 and the stylus 110 can reach other regions of the scalp to cut/snip or style the hair as shown in FIG. 13B. FIG. 12D depicts completion of the hair cut on one side of the scalp of the user. The wearable hair monitor and styler 100 can also accomplish complex haircuts completely automatically and an example of such a haircut of wavy or corn-rows appearance is illustrated in FIG. 12E. While accomplishing these tasks by the wearable hair monitor and styler 100, as in step 1714 of FIG. 17, it sends back feedback to the user device 1110 as in step 1716. The user device 1110 analyzes this feedback and compares the data with the parameters of the selected hair-style and or hair-health references as in step 1718. In a preferred embodiment, the user device 1110 also renders visual imagery and/or reports with respect to the task in progress in real-time basis as in step 1720. In another embodiment, one or more cameras may be mounted on the wearable hair monitor and styler 100 to capture the actions live. Full featured or partial functionality of the wearable hair monitor and styler 100 would present teaching opportunities exemplified but not limited to hair-styling classes, children hygiene education and children play situations.

Figure 13A:
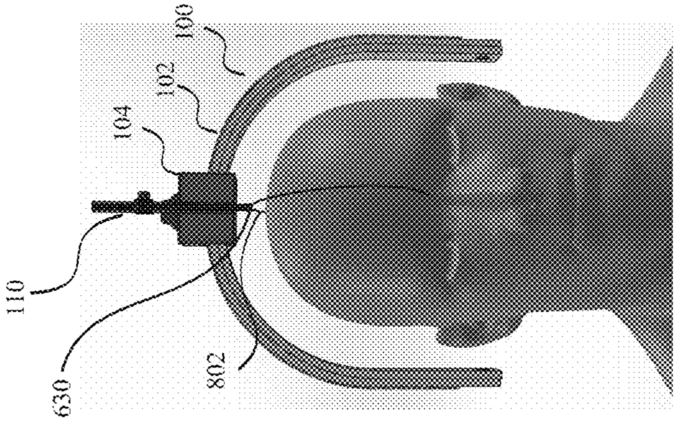

The wearable hair monitor and styler 100 can cut a hair by holding it at any desired height, direction and angle with respect to the root of the hair. FIGS. 10A-10C illustrate how the wearable hair monitor and styler 100 can cut a hair while holding it substantially vertically with respect to the scalp. When the engagement member 630 grabs gently a hair in “grip mode” and the stylus 110 moves away from the scalp, the software application of the present invention measures the length of the hair based on the distance travelled by the stylus 110/distal end 506/functional module with respect to a reference point on the positioner 104. In case of some hair styles, it is required that the hair is cut at a length determined on the basis of the location of the scalp, forehead, face or neck region of the user on which the free end of the hair should rest. FIGS. 13A to 13C illustrate some of such exemplary hair cut steps. In FIG. 13A, the engagement member 630 of the stylus 110 grabs a hair 802 gently or loosely in “grip mode”. The headband 102 then rotates to bring the positioner 104 and the stylus 110 to the forehead section of the user, as shown in FIG. 13B, while the engagement member 630 slides over the hair 802 taking it along without allowing the free end of the hair to slip out of it. The hair 802 is then snipped by the engagement member 630 once the stylus 110 reaches the desired location on the forehead of the user as shown in FIG. 13C. The length of the hair 802 is measured in this case based on the angle of rotation of the headband 102. Even the distance travelled by the positioner 104 along the headband 102 can be used to measure the length of a hair in some cases.

Figure 14C:
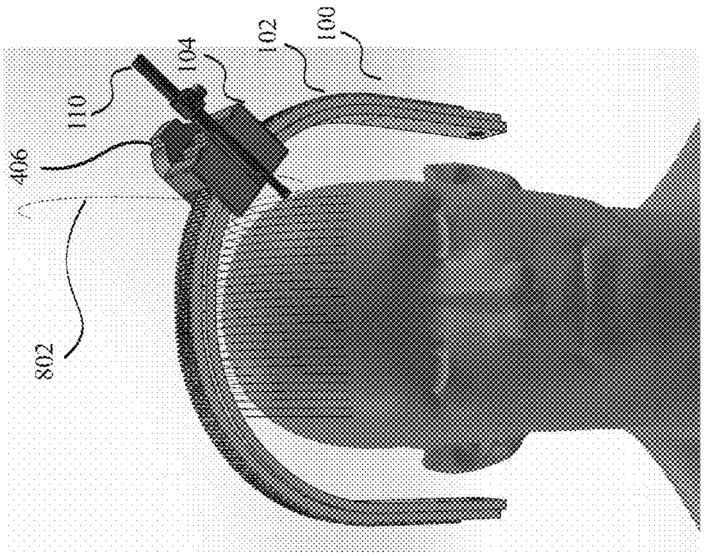
FIGS. 14A to 14C illustrate the wearable hair monitor and styler cutting hairs in a specific bangs pattern in accordance with an embodiment of the present invention.
Figure 14B:
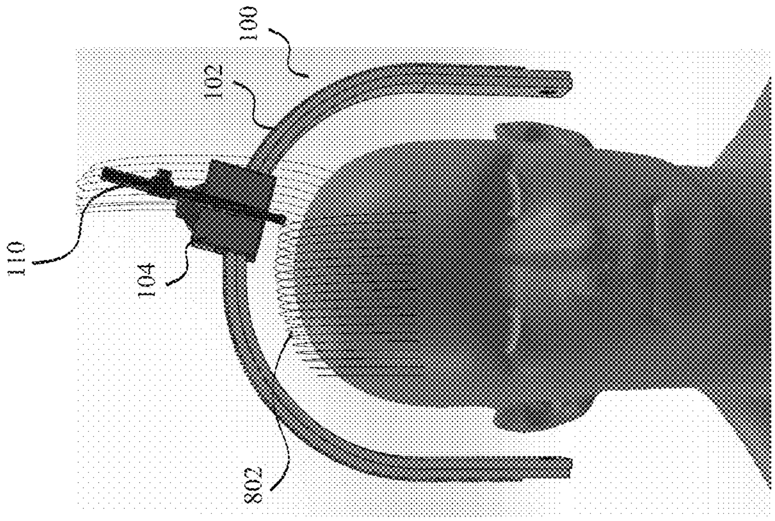
Figure 14A:
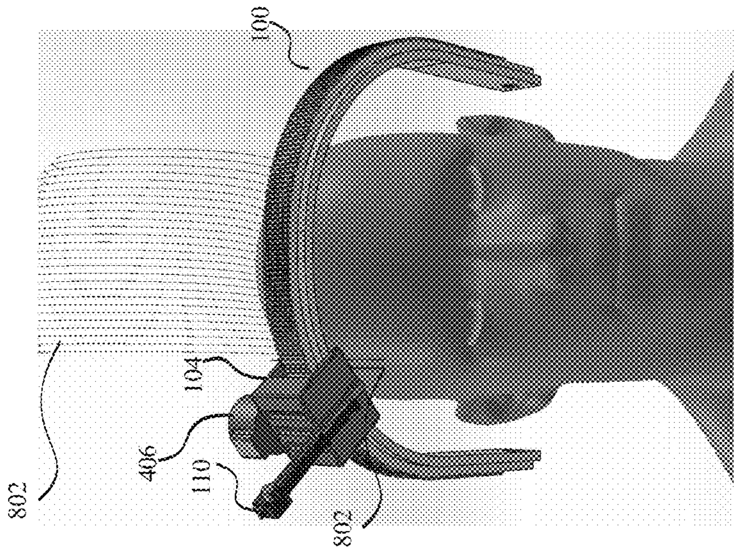
Figure 15A:
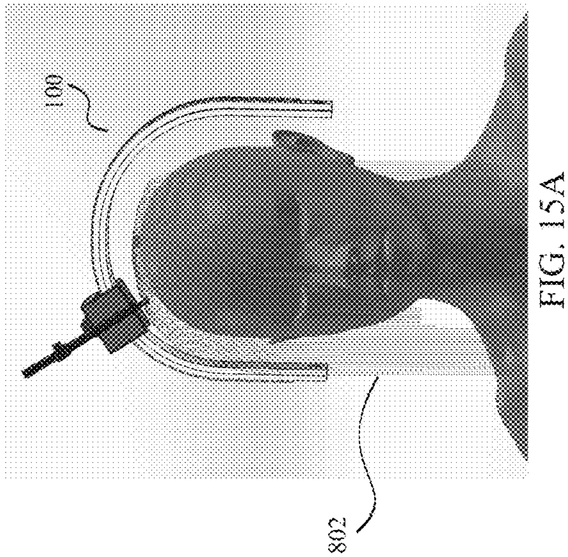
FIGS. 15A to 15D illustrate the wearable hair monitor and styler producing a desired hair cut in accordance with an embodiment of the present invention.
Figure 15B:
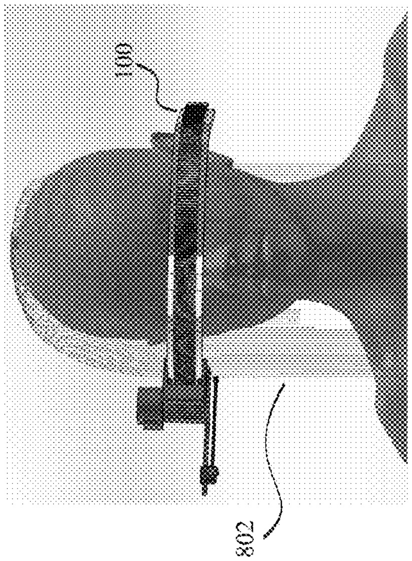
Figure 15C:
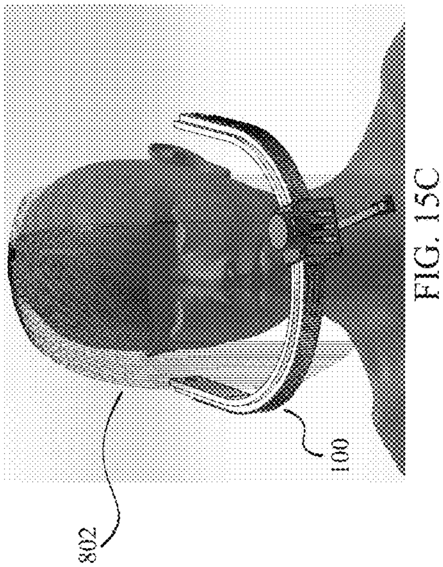
Figure 15D:
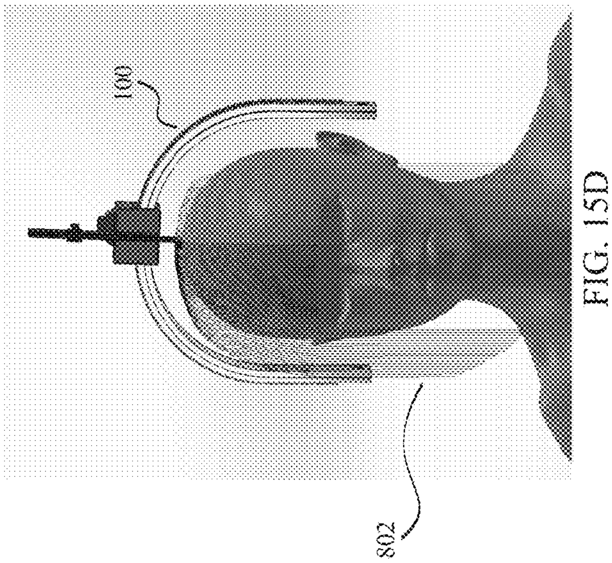

FIGS. 14A-14C depict how the wearable hair monitor and styler 100 completes a front haircut. Similarly, FIGS. 15A-15D illustrate the way the wearable hair monitor and styler 100 moves around to cut different strands of hair at different lengths to produce a specific haircut, in this case a popular paige-haircut. While the invention has been described with respect to one stylus 110 and one positioner 104 mounted on a single headband 102, it would be evident to one skilled in the art that more than one headband 102 having own positioner 104 and stylus 110 can be mounted on the same ear muff fasteners 106A and 106B with independent movement controls. Such an arrangement will allow the wearable hair monitor and styler 100 to cut a hair at a length which otherwise falls beyond the reach of the stylus when a single headband is used. With a single headband mounted on a pair of ear muff fasteners (EMF) the stylus/claw cannot go beyond the extreme angles of the headband. But, with two or more headbands mounted over a single pair of EMFs, one or more stylus/claw of one headband can hold a hair at withdrawn position of the stylus and the other stylus/claw can clip the hair at a desired length. Thus, having more than one headband on a pair of EMFs enables the wearable hair monitor and styler 100 to reach a greater distance of hair compared to the single headband version of the present invention. Also, the wearable hair monitor and styler 100 can trim facial hair of a user following the above-mentioned steps.

The wearable hair monitor and styler 100 is capable of performing its functions even at a single hair level, meaning it can handle even one hair at a time. This enables the wearable hair monitor and styler 100 to produce haircuts and stylings of unprecedented complexity, refinement, intricacy and visual-effects. The accuracy and precision provided by the wearable hair monitor and styler 100 also makes it possible to treat or monitor hair health at single-hair level. A combination of two or more wearable hair monitor and stylers 100, or a wearable hair monitor and styler 100 having two or more headbands 102 mounted on a single pair of ear muff fasteners, and/or two or more positioners mounted on a single headband, and/or two or more stylus mounted on a single positioner all working in tandem can create novel functions such as rapid-styling, turbo-styling, braiding, dread-locks and other hitherto impossible haircuts and stylings.

What is claimed is:

1. A system for hair health monitoring and styling, said system comprising:

a wearable automated hair health-monitor and styler comprising:

a headband having a track adapted for contouring a wearer’s head;

an ear muff fastener pivotally affixed to each of two opposing ends of said headband;

a positioner having a positioner drive mechanism slidably mounted to said headband;

a stylus having a stylus drive mechanism and a stylus body with a distal end mounted to said positioner such that said distal end is oriented to face toward said wearer’s head when said ear muff fasteners are worn over a temple area or ears of said wearer’s head; and a functional module adapted to be removably attached to said distal end; and a first computing device communicably connected to said wearable automated hair health-monitor and styler, said first computing device comprising one or more physical processors programmed with computer program instructions that, when executed by said one or more physical processors, program said first computing device to:

configure said wearable automated hair health-monitor and styler to position said distal end of said stylus at a desired position with respect to said wearer’s head as per a selection of a hair health monitoring and styling option, said desired position of said distal end being arrived at by configuring said ear muff fasteners to cause a rotation of said headband by a desired angle about a rotational axis of said headband passing through said two opposing ends, configuring said positioner drive mechanism to cause said positioner to traverse along said headband by a desired distance, and by configuring said stylus drive mechanism to cause a desired displacement of said stylus relative to said positioner along a desired path; and configure said functional module to perform one or more procedures as per said selection of said hair health monitoring and styling option.

2. The system of claim 1, wherein said functional module includes a functional module actuation mechanism and an engagement member.

3. The system of claim 2, wherein said one or more procedures include slidably holding a strand of hair from said wearer's head by said engagement member on being actuated by said functional module actuation mechanism in a grip mode as per said selection of said hair health monitoring and styling option or snipping said strand of hair by said engagement member on being actuated by said functional module actuation mechanism in a snip mode as per said selection of said hair health monitoring and styling option.

4. The system of claim 1, wherein a value of said desired angle and/or said desired distance and/or said desired displacement is zero.

5. The system of claim 1, wherein said desired displacement is a distance travelled by said distal end of said stylus to reach a proximity of a scalp area of said wearer's head, said proximity being sensed by a proximity sensor disposed at said distal end or at said functional module.

6. The system of claim 1, wherein said computer program instructions include instructions for displaying a user selectable menu on said computing device, said menu comprising one or more options for said selection of said hair health monitoring and styling option.

7. The system of claim 1, wherein said one or more procedures include collection of hair clippings by said functional module when configured to be electrostatically charged, capturing a still image or a video, heat-sealing of hair-ends of said strand of hair, creation of split-ends in said strand of hair, removing said split-ends from said strand of hair, applying a finish to said hair-ends, emitting a light, generating a vibration and dispensing of a liquid or a cream.

8. The system of claim 1, wherein each of said ear muff fasteners comprises an ear cup and an extensible locator, said extensible locator being actuable to extend toward said wearer's head and to retract back as per requirement.

9. The system of claim 8, wherein said ear cup is configured to be actuated to extend toward said wearer's head and to retract back as per requirement.

10. A method for hair health monitoring and styling, said method comprising:

placing an ear muff fastener over each of a temple area or ears of a wearer's head, each of said ear muff fastener being pivotally affixed to two opposing ends of a headband having a track adapted for contouring said wearer's head such that a distal end of a stylus mounted to a positioner slidably mounted to said track is oriented to face toward said wearer's head;

positioning said distal end of said stylus at a desired position with respect to said wearer's head as per a selection of a hair health monitoring and styling option, said desired position of said distal end being arrived at by configuring said ear muff fasteners to cause a rotation of said headband by a desired angle about a rotational axis of said headband passing through said two opposing ends, configuring said positioner to traverse along said headband by a desired distance, and by configuring said stylus to displace by a desired displacement relative to said positioner along a desired path; and configuring a functional module removably attached to said distal end to perform one or more procedures as per said selection of said hair health monitoring and styling option.

11. The method of claim 10, wherein said functional module includes a functional module actuation mechanism and an engagement member.

12. The method of claim 11, wherein said one or more procedures include slidably holding a strand of hair from said wearer's head by said engagement member on being actuated by said functional module actuation mechanism in a grip mode as per said selection of said hair health monitoring and styling option or snipping said strand of hair by said engagement member on being actuated by said functional module actuation mechanism in a snip mode as per said selection of said hair health monitoring and styling option.

13. The method of claim 10, wherein a value of said desired angle and/or said desired distance and/or said desired displacement is zero.

14. The method of claim 10, wherein said desired displacement is a distance travelled by said distal end of said stylus to reach a proximity of a scalp area of said wearer's head, said proximity being sensed by a proximity sensor disposed at said distal end or at said functional module.

15. The method of claim 10, further comprising configuring a first computing device to communicate with said wearable automated hair health-monitor and styler, said first computing device comprising one or more physical processors programmed with computer program instructions that, when executed by said one or more physical processors, program said first computing device for said positioning of said distal end of said stylus at said desired position.

16. The method of claim 15, wherein said computer program instructions include instructions for displaying a user selectable menu on said computing device, said menu comprising one or more options for said selection of said hair health monitoring and styling option.

17. The method of claim 10, wherein said one or more procedures include collection of hair clippings by said functional module when configured to be electrostatically charged, capturing a still image or a video, heat-sealing of hair-ends of said strand of hair, creation of split-ends in said strand of hair, removing said split-ends from said strand of hair, applying a finish to said hair-ends, emitting a light, generating a vibration and dispensing of a liquid or a cream.

18. The method of claim 10, wherein each of said ear muff fasteners comprises an ear cup and an extensible locator, said extensible locator being actuable to extend toward said wearer's head and to retract back as per requirement.

19. The method of claim 18, wherein said ear cup is configured to be actuated to extend toward said wearer's head and to retract back as per requirement.

* * * * *